US006973619B1

(12) United States Patent
Hirose et al.

(10) Patent No.: US 6,973,619 B1
(45) Date of Patent: Dec. 6, 2005

(54) METHOD FOR GENERATING DISPLAY CONTROL INFORMATION AND COMPUTER

(75) Inventors: Shinichi Hirose, Tokyo-to (JP); Fumihiko Kitayama, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,992

(22) Filed: Jun. 30, 1999

(30) Foreign Application Priority Data

Jun. 30, 1998 (JP) .................................. 10-184392
Feb. 17, 1999 (JP) .................................. 11-038422

(51) Int. Cl.$^7$ ............................................. G06F 17/00
(52) U.S. Cl. ....................... 715/530; 715/744; 709/203
(58) Field of Search ................................ 707/526, 505, 707/507.1; 715/526, 505, 501.1, 530, 744, 715/841; 345/734, 740, 744, 600; 709/203

(56) References Cited

U.S. PATENT DOCUMENTS

| | | | | |
|---|---|---|---|---|
| 5,295,241 A | * | 3/1994 | Eagen et al. ................. | 345/744 |
| 5,485,560 A | * | 1/1996 | Ishida et al. ................. | 345/419 |
| 5,649,131 A | * | 7/1997 | Ackerman et al. ........... | 345/744 |
| 5,867,153 A | * | 2/1999 | Grandcolas et al. .......... | 705/39 |
| 6,023,714 A | * | 2/2000 | Hill et al. .................... | 715/513 |
| 6,260,050 B1 | * | 7/2001 | Yost et al. ................. | 715/501.1 |
| 6,473,100 B1 | * | 10/2002 | Beaumont et al. ........... | 345/781 |
| 6,567,796 B1 | * | 5/2003 | Yost et al. ................. | 707/2 |
| 6,591,289 B1 | * | 7/2003 | Britton ....................... | 709/203 |

FOREIGN PATENT DOCUMENTS

WO    WO 98/15091    4/1998

OTHER PUBLICATIONS

Kirste T. et al., "A Presentation Model for Mobile Information Visualization" Computers and Graphics, GB. Pergamon Press Ltd., Oxford. vol. 20, No. 5, Sep. 1, 1996, pp 669-681, XP004015418 see p. 670 left hand col. line 22 to right hand col. line 6.

* cited by examiner

*Primary Examiner*—Sanjiv Shah
*Assistant Examiner*—Maikhanh Nguyen
(74) *Attorney, Agent, or Firm*—Scully, Scott, Murphy & Presser; Rafael Perez-Pineiro

(57) ABSTRACT

The present invention dynamically generate documents or display control information so as to provide client terminals of various capability with user interface in compliance with each terminal's capability. More particularly, the present invention is directed to a method for generating display control information so as to display in a form adapted to a terminal used by a user. The method comprises the steps of: receiving a display request from the terminal; generating a group of data objects concerning the contents of the display, generating a group of view objects for generating the display control information; and by referring to the information about the attributes of the terminal, generating the display control information by the group of view objects.

2 Claims, 27 Drawing Sheets

FIG. 12

| VARIABLE NAME | EXAMPLE OF VALUE |
|---|---|
| ScreenSize (SCREEN SIZE) | 640x480, 1280x765, 160x160 |
| ScreenRatio (ASPECT RATIO) | 4:3, 16:9, 1:1, 3:4, 9:16 |
| ScreenQuality (SCREEN FINENESS) | EXELLENT, GOOD, NORMAL, BAD |
| ColorDepth (NUMBER OF COLORS) | 2(WHITE AND BLACK), 16, 256, 16M |
| ModemSpeed (COMMUNICATION SPEED) | 14.4K, 33.6K, 56K, 128K, UNLIMIT |
| Image (WHETHER IMAGES ARE USABLE) | YES, SLOW, NO |
| Table (WHETHER TABLES ARE USABLE) | YES, DIFFICULT, NO |
| Frame (WHETHER FRAMES ARE USABLE) | YES, NO |
| ScrollBar (WHETHER SCROLLING IS POSSIBLE) | YES, NO |
| PointingDevice (WHETHER POINTING DEVICE IS USABLE) | YES, DIFFICULT, NO |

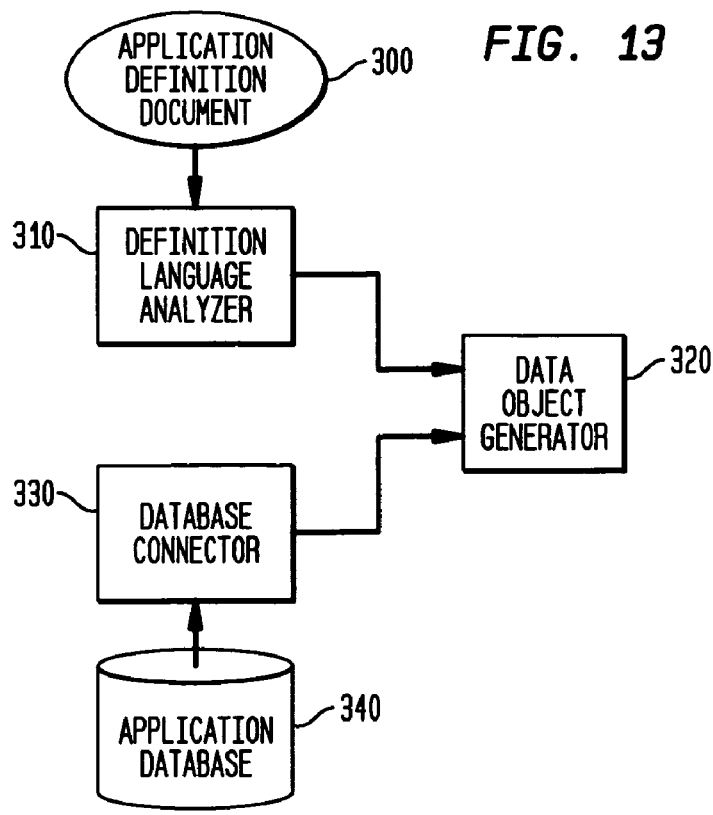

```
<Web Service name="Restaurant information service">
  <Process name="Restaurant Retrieval">
     .
     .
     .
</Process>
<Process name="Restaurant Information Display">
  <Display item name="Restaurant Information">
     <Display item name="Restaurant Attribute List">
       <Display item name="Genre">Japanese</Display item>
       <Display item name="Open Time">11:00-23:00</Display item>
          .
          .
          .
     </Display item>
     <Display item name="Guide Information">
          .
          .
          .
     <Link Process="Restaurant Retrieval"/>
  </Process>
</Web Service>
```

FIG. 15

```
<PROCESS name="RESERVATION PROCESSING" >
  <DISPLAY ITEM name ="RESERVATION STATE DISPLAY"
      pageGrp ="REPROCESSING INHIBITED AFTER RESERVATION ACCEPTANCE">
  <DISPLAY ITEM name ="RESERVED TIME" >3/1 13:00...
  <DISPLAY ITEM name ="VACANCY INFORMATION" >3 TABLES VACANT...
  <DISPLAY ITEM name ="RESERVED TIME" >3/2 18:00...
  <DISPLAY ITEM name ="VACANCY INFORMATION" >10 TABLES VACANT...
          .
          .
          .
  </Display item>
  <DISPLAY ITEM name="RESERVATION ACCEPTANCE SCREEN" >
      pageGrp ="REPROCESSING INHIBITED AFTER RESERVATION ACCEPTANCE">
  <INPUT ITEM name ="DESIRED TIME" >
  <DECISION BUTTON name ="RESERVATION"
    <invGrp="REPROCESSING INHIBITED AFTER RESERVATION ACCEPTANCE">
  </Display item>
  <DISPLAY ITEM name="RESERVATION ACCEPTANCE RESULT SCREEN" >...
</PROCESS>
```

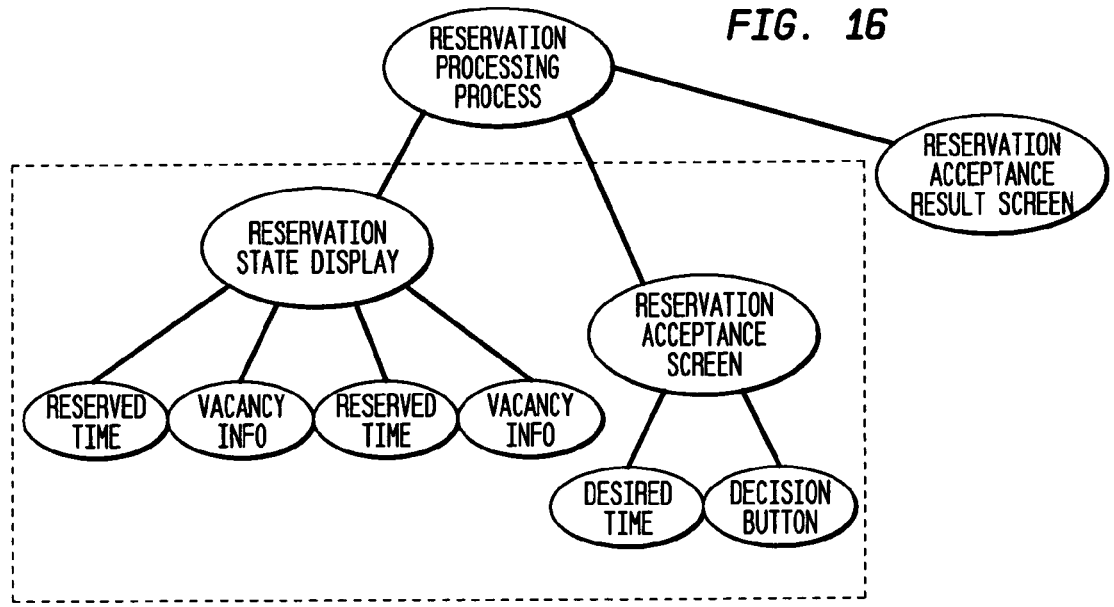

```
<Web Service name="Restaurant information service">
  <Process name="Restaurant Retrieval">
        .
        .
        .
</Process>
<Process name="Restaurant Information Display">
    <DB referential display item name="Restaurant Information" SQL="select * from XXX"/>
    <DB referential display item name="Restaurant Attributes list">
       <DB referential display item name="Genre"> dbref="genre"/>
       <DB referential display item name="Open time"> dbref="open"/>
         .
         .
         .
    </DB referential display item>
    <DB referential display item name="Guide Information">
         .
         .
         .
    <Link process="Restaurant Retrival"/>
  </Process>
</Web service>
```

FIG. 18

| ATTRIBUTE NAME | TYPE | DESCRIPTION |
|---|---|---|
| CHILD OBJECT | COLLECTION OF DATA OBJECT | DEFINE A TREE STRUCTURE |
| PRIORITY | NUMBERS | NUMERICAL IMPORTANCE OF DATA |
| ALWAYS DISPLAYED | SWITCH | WHETHER OR NOT TO ALWAYS BE DISPLAYED EVEN IF DIVIDED |
| INDIVISIBLE | SWITCH | WHETHER OR NOT THE OBJECT CONTENT CAN BE DIVIDED |
| IMAGE OUTLINING | SWITCH | WHETHER OR NOT THE IMAGE MAY BE OUTLINED |
| (ATTRIBUTE DATA UNIQUE TO APPLICATION) | (ARBITRARY TYPE) | DEFINE DATA UNIQUE TO EACH APPLICATION |

METHOD FOR GENERATING DISPLAY CONTROL INFORMATION AND COMPUTER

BACKGROUND OF THE INVENTION

1. Technical Field

The present invention relates to a method and mechanism for generating control instructions to display documents, etc. in a form adapted to a terminal used by a user and a mechanism, more particularly to a method and mechanism for outputting HTML (Hyper Text Markup Language) documents, etc. in a form adapted to various attributes such as the sizes of display screens and/or communication speeds, of various terminals used by a user, such as PDA (Personal Digital Assistance), a personal computer (PC), TV set or a cellular phone having an information display function.

Moreover, the present invention relates to a facility, in conjunction with the facility for dynamically generating a page, for controlling in detail authentication and reexecution considering a history mechanism of a terminal.

The present invention relates particularly to a facility wherein, in a transaction such as updating a database or displaying a page for which strict user authentication is necessary, a process such as suppression of reexecution or reauthentication can readily be specified and operates from an application even if a page is dynamically generated.

2. Prior Art

As Web-based technology becomes popular, so-called thin client types of systems which use a Web browser for user interface and execute an application program at a Web server (application server) are increasingly used. In such cases, information sent from a server to a client is an HTML document including a form, and only if the Web browser operates at the client's terminal, an application can be run without being distributed or installed to each client beforehand. Also, in general, the client side can be operated by using hardware of lower throughput compared to a case where an application runs on the client side.

Conventionally, a low-end PC has been used for such a client terminal. Recently, however, Web browsers have come to operate on hardware of even lower throughput and low cost, such as PDAs, handheld PCs, set-top boxes and car navigation systems, etc, and new terminal equipment such as a cellular phone with a Web browser feature has been developed. Therefore, significant low usability has arisen, for instance, that a Web page well displayed on a PC with a large display area requires frequent scrolling operations on a PDA with a small display area.

There is a method to cope with this problem, described in Japanese Published Unexamined Patent Application No. Hei 10-133973, namely to provide, in advance, multiple HTML documents and other accompanying resources corresponding to all possible types of client terminals and return appropriate ones for each request from a client by determining the type of its terminal. In this case, however, there is a demerit that massive data needs to be created and the work load of system development becomes enormous. The work load for a new type of client terminal is also huge.

There is also another method proposed, which is namely, to provide only standard HTML documents for PCs and modify their contents according to capability of the client terminal. It is, for instance, in case of a terminal with a small display area, to create reduced images and send to the client an HTML document which is modified so as to refer to the reduced images. The aforementioned Japanese Published Unexamined Patent Application No. Hei 10-133973 also mentioned that an HTML document is transformed so as to adapt it for multiple terminals. However, no mention is made as to a concrete method of such transformation.

In addition, Japanese Published Unexamined Patent Application No. Hei 10-21165 discloses a communication system which transfers hyper-texts obtained from a server after editing them to fit their data size and data layout into physical environment and user life scenes of the client receiving them. This physical environment includes the type of communication lines, the performance of terminals such as being a workstation or a cellular phone, number of colors and sizes of displayable images, etc. The user life scenes include the data such as a user is on the way to the office, traveling on business, sitting on the desk, taking holidays, etc. This application discloses that physical environment and user life scenes are used for selecting transferred information, but it does not disclose anything particular as to screen configuration.

In addition, T. W. Bickmore et al, "Digestor: Device-Independent Access To The World Wide Web", described a method that, when a proxy receives a request for an HTML document, it creates a new HTML document by fetching the document from a specified HTTP (Hyper Text Transport Protocol) sever, parsing the HTML document into an AST (Abstract Syntax Tree) and performing predetermined transforming operations on the AST. In Digestor, an HTTP server must first creates an HTML document which is accordingly required when creating an AST. Also, as a transformed AST itself is converted into an HTML document, the AST itself does not perform control when creating an HTML document.

Or it is possible, as to reexecution of a page, to add identification information or a state of a session to a URL or HTTP header information (so-called Cookies) (for instance, see a Servlet function (SUN, Java Servlet API Specification Ver. 2.1), Session Tracking of IBM WebSphere, etc.). However, they only identify and restore a state and do not include control on reexecution of a page which is an object of the present invention.

With regard to control on reexecution of a page in transaction processing of a database, a technique of numbering URLs so as to inhibit reexecution of a page once displayed is widely known (for instance, it is introduced as "once-only" URL in 13.13 History Lists of RFC2068 HTTP 1.1 Specification).

However, if an authentication state or control on reexecution is to be dynamically changed by processing of an application or diversity of a terminal, programming becomes complicated (it may happen that flexible processing is impossible only with basic functions, and all of originally reexecutable portions cannot be reexecuted).

In addition, since pages are not organized, specification of a page in such a processing program becomes so complicated that necessity for total modification arises in the case of addition or deletion of a page, and thus productivity/maintainability and reliability of software are lowered. In case of a system which automatically divides a page by a terminal, it is difficult to control it in such a method.

An object of the present invention is to dynamically generate documents or display control information for providing client terminals of various capabilities with user interfaces in accordance with each client terminal's capabilities.

It is also an object of the present invention to provide a mechanism for making applications running on a server independent of any client terminal which uses the results of their processing.

In addition, it is also an object of the present invention to separate processing of applications running on a server and creation of a document showing the results of the processing so that only the part for the document creation needs to be changed even when various new client terminals emerge.

A still further object of the present invention is to furnish, for an operation and a request onto a past page by using a history mechanism of a terminal, a mechanism for controlling its reexecution and/or reauthentication and a mechanism for readily controling it an application program.

Moreover, a still further object is to keep this mechanism for controlling operable according to a terminal or even when a page is dynamically generated by an application.

In addition, a still further object is, from an application program, to eliminate any effect of dynamic generation of a page or an application so that it may become possible to readily specify the control.

SUMMARY OF THE INVENTION

The present invention is a method for generating display control information (HTML document, for instance) so as to display in a form adapted to a terminal used by a user. The method comprises the steps of: receiving a display request from the terminal; in response to the display request, generating a group of data objects concerning the contents of the display, wherein the group of the data objects is independent of the terminal; by using the group of data objects and information about an attribute of the terminal, generating a group of view objects for generating the display control information; and by referring to the information about the attribute of the terminal, generating the display control information by the group of view objects. Thus, as a group of data objects are generated independently of any terminal, even if a new terminal comes to output a display request, part which generates the group of data object does not need to be changed. In addition, the group of data objects themselves does not need to be changed as long as the request content is the same. Meanwhile, the terminals are equipments such as ordinary PCs, PDAs, TV sets and cellular phones on which a browser is available.

Moreover, it is also possible to comprise the steps of: receiving terminal (type) identification information from the terminal; and obtaining the information about the attributes of the terminal from the terminal identification information. To obtain the information about the attributes of the terminal, there are various methods such as storing in advance pairs of terminal type identification information and information about the attributes of the terminal, and entering information about the attributes of the terminal at its first access, etc.

The aforementioned step of generating a group of view objects may also comprise the steps of: generating a root object of the group of view objects; and having child objects generated by the root object. The root object may also have a method for generating child objects by referring to information about the attributes of the terminal. These child objects generate grandchild objects as required.

It is possible that the data objects retain instruction information used for generating corresponding view objects and generating the display control information by the view objects. The instruction information includes priorities of objects, information of whether or not splitting is possible, and information of whether or not outlining is possible, etc. In addition, information about the attributes of the terminal includes the screen size of the terminal, communication speed, aspect ratio, and number of colors. Moreover, although display control information in the embodiments is in Hyper Text Markup Language (HTML), it may be in any other markup language.

The aforementioned step of generating display control information may also comprise a step of sequentially generating display control information of responsible parts starting from a root object of the group of view objects by referring to the information about the attributes of the terminal. The root object generates display control information for an entire page, and the child objects generate display control information for the page content. As view objects refer to information about the attributes of the terminal, different display control information maybe generated even if these view objects are the same.

In the present invention, if a display request from the same terminal is related to a former display request, following steps may be further executed: in response to a display request from the terminal, determining whether or not it is necessary to generate a new group of data objects according to the request; and if it is not necessary to generate a new group of data objects, generating the display control information corresponding to the display request by related view objects in the group of view objects. If the data objects do not need to be changed, the view objects newly can generate display control information which responds to the new request. However, in some cases necessary view objects may have to be created while it is not required to newly create a group of data objects.

As described above, since data objects and view objects are generated as required, what exist in a server before generating them are a module for, in response to the display request from a terminal, generating a group of data objects concerning the contents of the display, wherein the group of the data objects is independent of the terminal; a module for, by using the group of data objects and information about the attributes of the terminal, generating a root view object for generating the display control information; and a module for ordering the root view object to generate its child view object; and a module for ordering the root view object to generate the display control information.

The server may further include a module for deriving the information about the attributes of the terminal from terminal (type) identification information received from the terminal.

It is also possible that the above-mentioned child view objects have a method for generating its child objects and the root view object orders its child view objects to generate the display control information. In addition, it is also possible that view objects including a root view object and child view objects have a method for generating the display control information by referring to information about the attributes of the terminal.

If the present invention explained above is implemented in a program, the program may be stored in storage media such as CD-ROM and FD (floppy disk).

To control reexecution, reauthentication and the like of a page in a history, page definitions are grouped when an application is developed. This group may further comprise another subgroup so that the entire page definitions form a tree structure. These page definitions may be included in the instruction information used for generating the display control information. Grouping is performed to page definitions in this instruction information. Thus, it is possible, just by designating an arbitrary group name, to readily and flexibly specify a set of pages as mentioned later whose reexecution is inhibited or whose authentication state is changed.

At an execution time, in addition to the step of generating the display control information, the steps of: determining whether reexecution of a page in a history has been performed; if the page is reexecuted and a cache of the processing state exists, restoring the processing state; processing an application and storing in a cache a processing state at that time; and according to a result of processing an application, and clearing a processing state corresponding to a page specified by the group of page definitions may be integrated.

Moreover, in addition to the steps of generating the display control information and controlling reexecution of a page in a history, the steps of: checking whether a page in a history requires authentication and what is its authentication state; ensuring authentication when authentication is necessary; and according to a result of processing an application, modifying an authentication state of a page in a history may be integrated. However, modifying of an authentication state may be easily designated by an application developer by specifying a group of page definitions just as in controlling reexecution.

BRIEF DESCRIPTION OF THE DRAWINGS

Preferred embodiments of the present invention will now be described, by way of example only, with reference to the accompanying drawings in which:

FIG. 12 is a diagram showing an example of contents of information about attributes of the terminal.

FIG. 13 is a functional block diagram used for generating data objects.

FIG. 14 is a diagram showing an example of application definition documents.

FIG. 15 is a diagram showing an example of specifying reexecution control to the application definition language of FIG. 14.

FIG. 16 is an example of a restaurant of FIG. 15, particularly showing a page definition tree in the portion of a reservation processing process.

FIG. 17 is a diagram showing an example of definition documents containing a database designation.

FIG. 18 is a diagram showing an example of a group of data objects.

DETAILED DESCRIPTION OF THE PREFERRED EMBODIMENTS OF THE INVENTION

Figure 1:
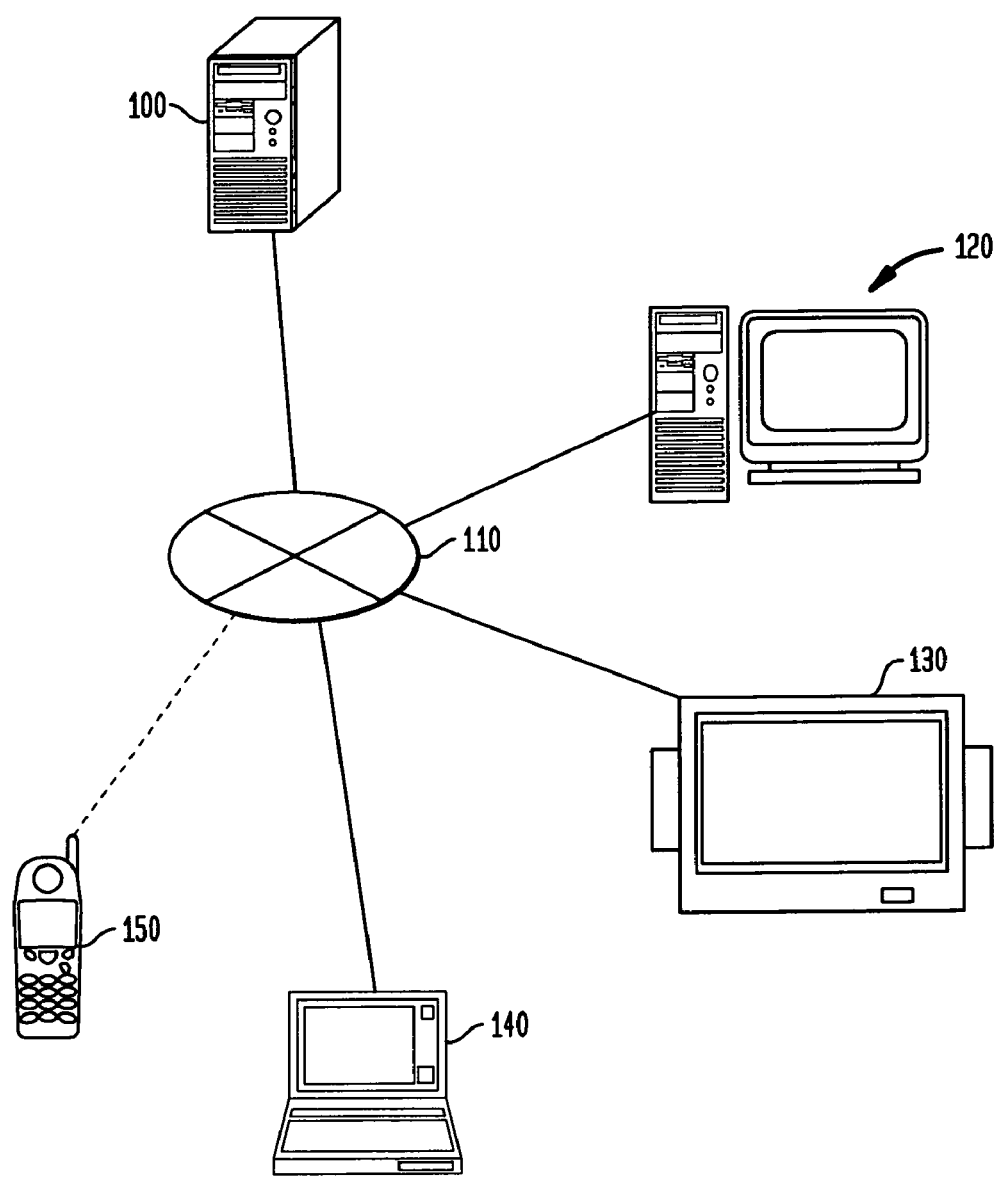
FIG. 1 is a block diagram showing the entire system of the present invention.

First, the entire system related to the present invention is explained by using FIG. 1. FIG. 1 shows Web server 100 related to the present invention, ordinary PC 120, TV set 130, portable computer 140 and cellular phone with a built-in Web Browser 150, all connected via network 110. PC 120, TV set 130 and portable computer 140 have a Web Browser and obtain information from HTTP server 100. Client terminals may be other equipments which have a Web Browser. Since cellular phone 150 is connected with network 110 via wireless, it is connected with network 110 by a broken line in FIG. 1. Thus, the computers connected with network 110 are respectively different in terms of their display screen size, communication speed, throughput and operability. Accordingly, documents to appear on respective displays are preferably those which are adapted to capabilities of respective terminals. The methods for adapting a displayed document to a terminal may include one to cope with it on the terminal side. As regards the present invention, however, HTTP server 100 is composed as in the following explanation.

Figure 2:
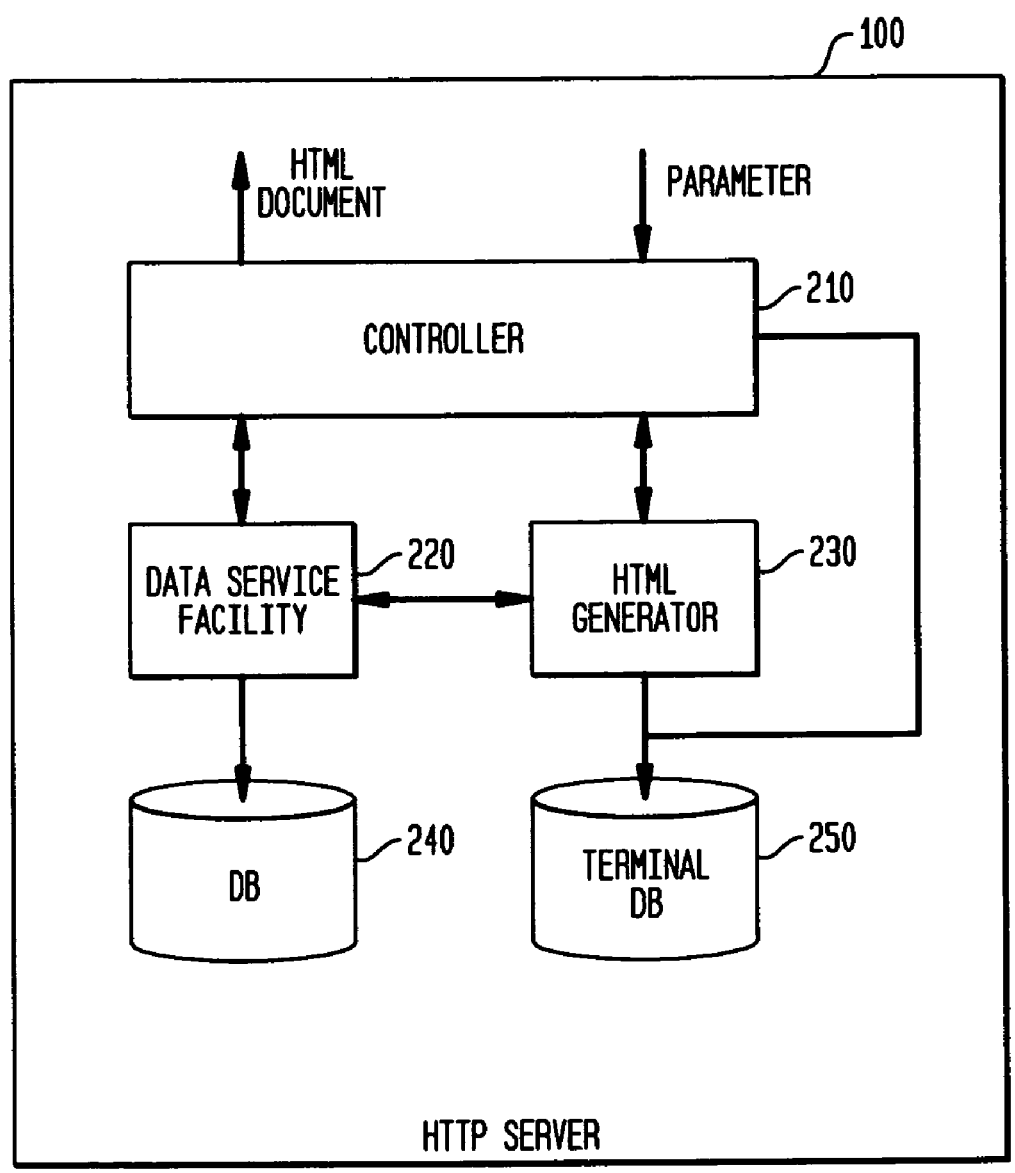
FIG. 2 is a block diagram of functions within HTTP server 100.

A functional block diagram of this HTTP server 100 is shown in FIG. 2.

Figure 3:
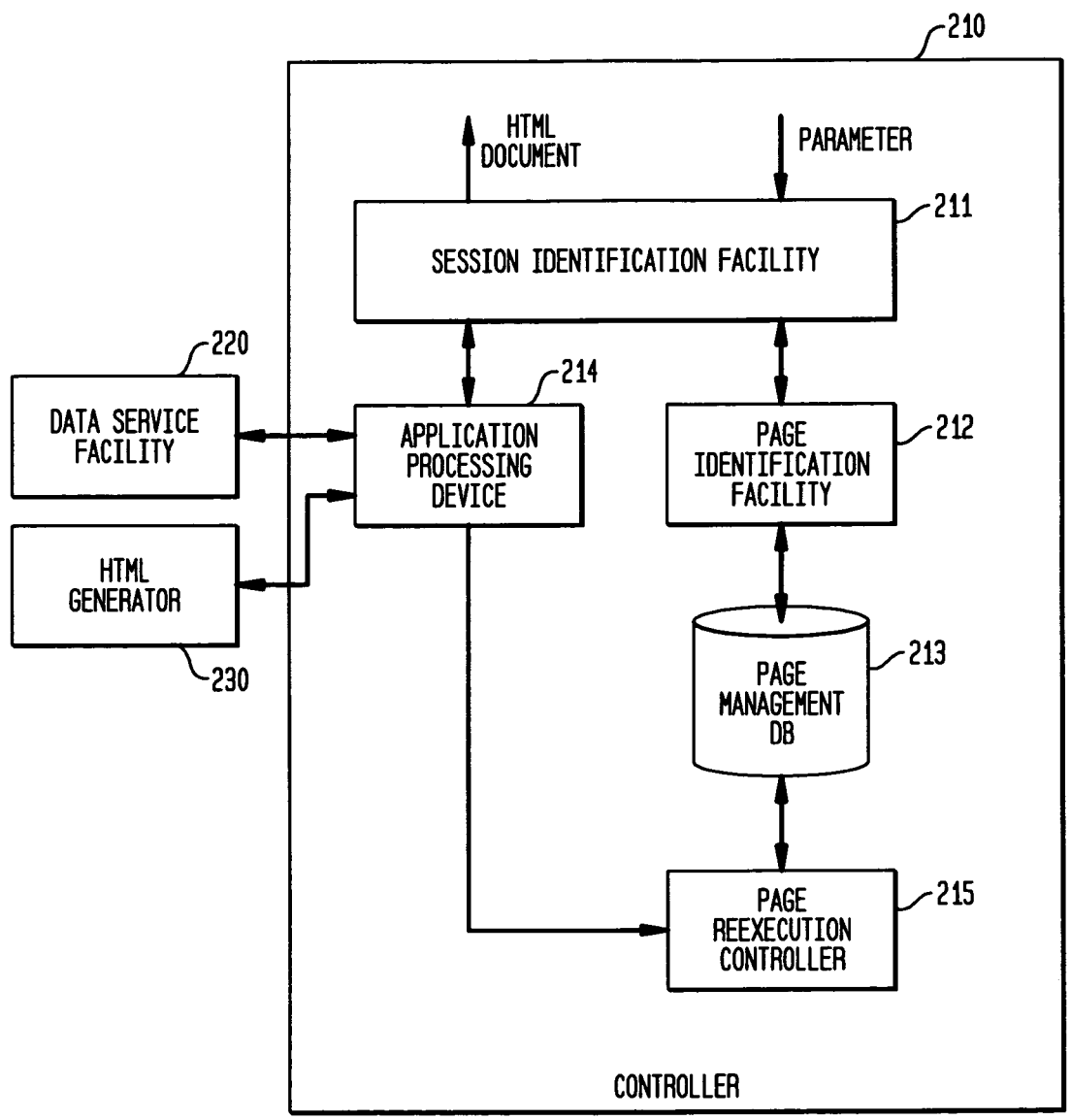
FIG. 3 is a block diagram of functions of controller explained in FIG. 2.

Also, a detailed block diagram of sub-functions of controller 210 in a functional block of HTTP server 100 is shown in FIG. 3.

As shown in FIG. 2, HTTP server 100 comprises controller 210, DB 240, data service facility 220, HTML generator 230 and terminal DB 250.

Controller 21Q receives various parameters from client terminals 120 to 150 and returns adequate HTML documents corresponding to them. For this, it controls operation of data service facility 220 and HTML generator 230. In Web applications, a series of requests from the same client terminal are often a unit for processing. Accordingly, it is required to identify requests from the same client from multiple requests and, even when generation of HTML documents is complete, to continue operation as an application by not releasing the resources and keeping their state to prepare for a next access.

Here, a series of accesses by a client terminal is called a session. Accordingly, controller 210 administers a session and determines whether a request belongs to an existing session or whether a new session should be initiated. It may also access to terminal DB 250 to obtain information about attributes of the terminal from identification information obtainable from client terminals 120 to 150, and output the information about attributes of the terminal to HTML generator 230. Data service facility 220 and HTML generator 230 may also respectively access to terminal DB 250.

As shown in FIG. 3, controller 210 comprises, so as to control reexecution and authentication, etc. of a page, detailed functions of session identification facility 211, page manager 212, page management DB 213, application processing device 214 and page reexecution controller 215.

Session identification facility 211 analyses a parameter sent from a terminal and identifies which session is making a request from a terminal so as to identify data unique to a session. Likewise, it analyses a parameter to determine whether a page in a history of a browser is reexecuted and/or whether the page requires authentication so that page manager 212 identifies a necessary page and fetches necessary information from page management DB 213 to restore a past processing state required for authentication and/or reexecution. If processing of page manager 212 ends or if such processing is not required, processing switches to application processing device 214.

Application processing device 214 executes a process unique to a Web application. For instance, in the case of a banking application, actual banking business is performed. On the basis of this processing result, page reexecution controller 215 updates page management DB 213. Namely, if a process inhibits reexecution of a past page, it removes from page management DB 213 a state cache required for reexecution of a process.

As data service facility 220 has to perform processing requests such as requests for retrieval from client terminals 120 to 150, etc., it includes a part for accessing to DB 240 as required to generate a group of data objects and the group of data objects themselves which access to DB 240 to represent their contents and process a session. This group of data objects are generated for each session and configured in this embodiment as a tree structure whose root is an object representing the entire processing in accordance with a Web page's document structure. Objects corresponding to leaves are ones corresponding to data such as character strings and images. However, it is not limited to a tree structure.

HTML generator 230 includes a part for generating a group of view objects by using information from a group of data objects and terminal DB 250 and the group of view objects themselves. If a root view object receives an order to generate an HTML document from controller 210, the group of view objects sequentially output an HTML document starting from the root view object. The information obtained from terminal DB 250 is also used at this HTML document output. The structure of a group of view objects generated from a group of data objects changes based on the information obtained from terminal DB 250, and the HTML documents output by a group of view objects also change. Namely, even if the same group of data objects are generated, the structure of the group of view objects may change, and even if the group of view objects are the same, the HTML documents to be output may be different. If an entire HTML document is generated, it is transferred from controller 210 to client terminals 120 to 150 which request it. The part for generating a group of view objects and the group of view objects themselves may also refer to the other parameters mentioned later on.

In current HTTP server 100, an HTML document is dynamically generated by using a mechanism called CGI (Common Gateway Interface) or a servlet (See Sun Microsystems Inc., Java, JDK 1.2, The following describes an example of implementing it by using servlets. This is because it is easy to continuously hold data as required for a Web application and the following requirements of the present invention are satisfied. However, it may also be implemented by a CGI. In that case, a background process is used so as to perform interprocess communication with a process activated by a CGI. It is also possible to implement the components required for the present invention in a form of a Web proxy server.

Figure 4:
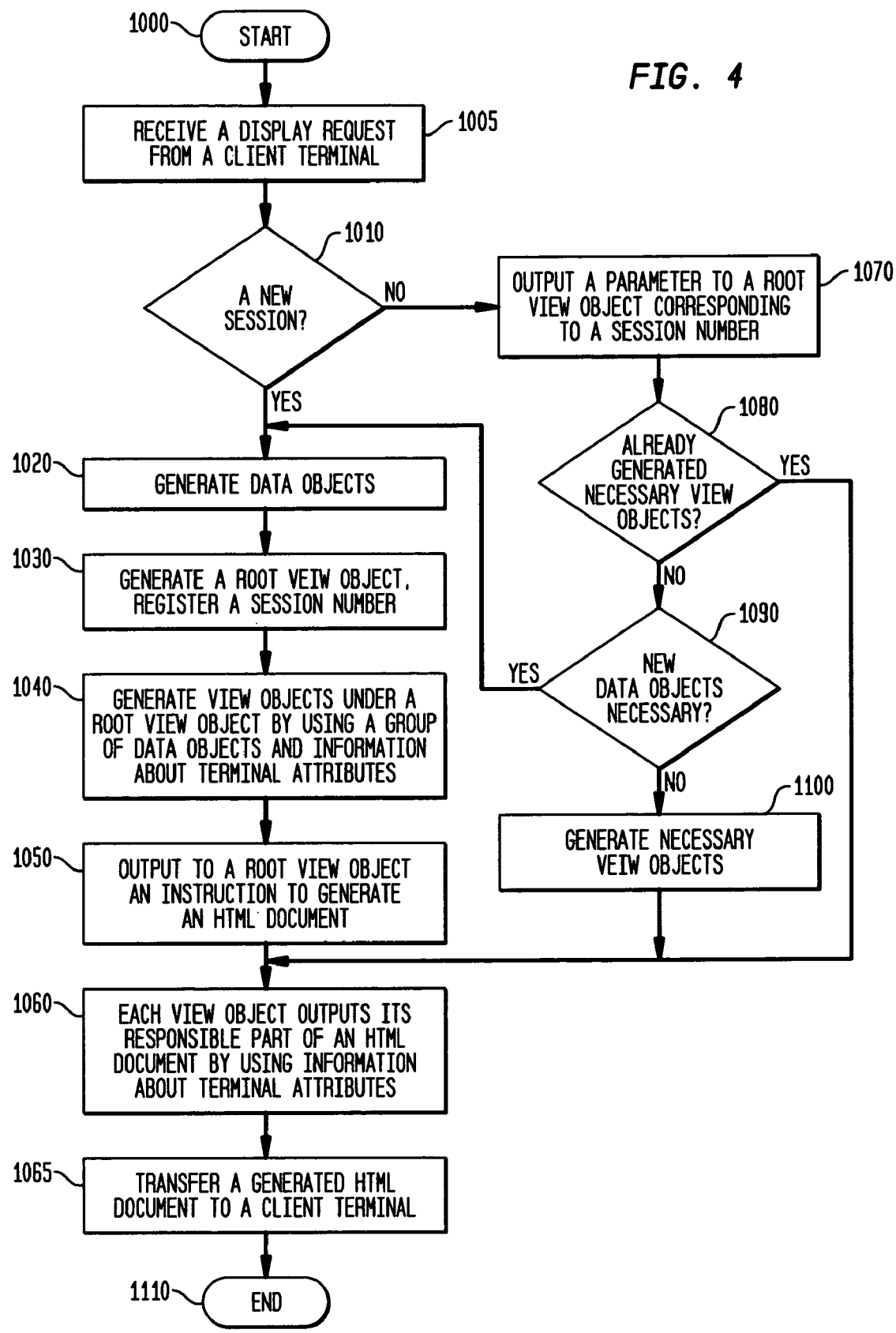
FIG. 4 is a flowchart for explaining the processing of HTTP server 100.

Now, the entire processing by HTTP server 100 is explained by using FIG. 4. First, a display request is received from client terminals 120 to 150 (step 1005). This display request uses, for instance, a User-Agent field which is contained in a URL (Uniform Resource Locator) and an HTTP header. For instance, a URL is "http: aServer/servlet/RestaurantDemo", and a User-Agent field of an HTTP header is "deviceID." A User-Agent field is used to obtain information about attributes of the terminal to be used later from terminal DB 250. Then, it is determined from a URL whether it is a new session (step 1010). If it is a new session, it moves on to step 1020 since the URL does not contain session=session number. On the other hand, if it is not a new session, as the URL contains session=session number, the number is used.

In case of a new session, data access facility 220 first generates a group of data objects related to the requested display content (step 1020). The process of generating data objects is described later.

Next, a root view object is generated by HTML generator 230 (step 1030). This view object has a method for creating child view objects (or a method for requesting child view object generator to create child view objects) and a method for generating an HTML document. A pair of the root view object and the session number is registered in a table. This table is used in step 1010. Then, view objects subsequent to the root view object are sequentially generated by using the generated group of data objects and information about attributes of the terminal. This process is explained later with an example. When the necessary group of view objects are generated, the root view object is ordered to generate an HTML document by controller 210 (step 1050). A root view object which has received this order generates an HTML document of its responsibility and then requests its child view objects to generate a part of the HTML document thereafter. Then, the child view object and those subsequent to it generates a part of the HTML document of their responsibility (step 1060). Controller 210 transfers the generated HTML document to the client terminal (step 1065).

Figure 5:
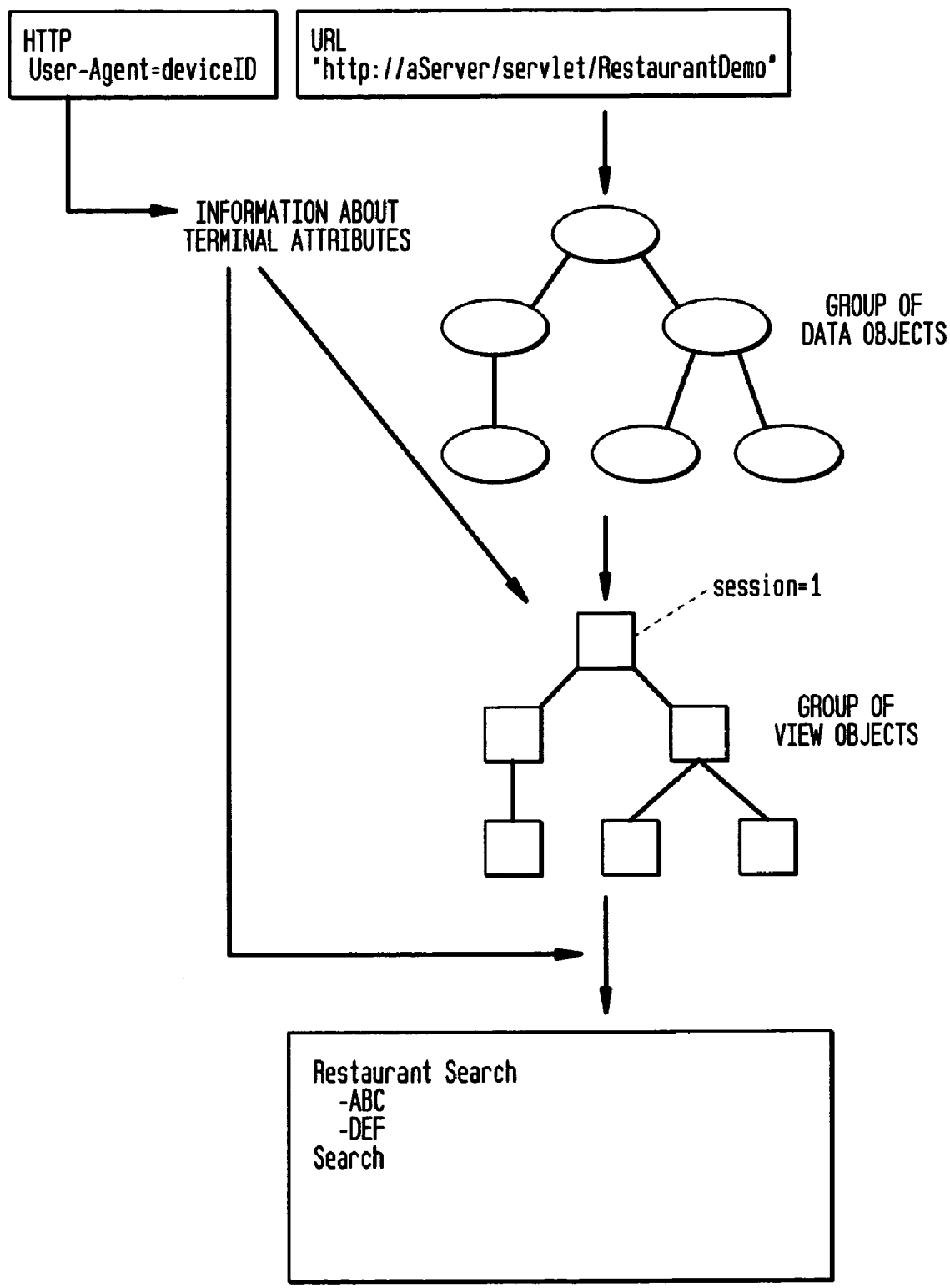
FIG. 5 is a diagram showing an example of processing overview.

FIG. 5 shows the processing so far in a schematic way. First, controller 210 receives HTTP's User-Agent Field and a URL. Then, data service facility 220 generates a group of data objects from the information of the URL received from controller 210. On the other hand, the User-Agent Field is used to obtain information about attributes of the terminal. Then, controller 210 orders HTML generator 230 to generate a root view object, and HTML generator 230 generates a root view object while referring to a root object of the group of data objects and information about attributes of the terminal. As to object other than the root view object, a parent view object generates child view objects while referring to the group of data objects and information about attributes of the terminal. If the generated root view object is ordered to generate an HTML document by controller 210, an HTML document as shown in FIG. 5 is generated by each view object subsequent to the root view object, the document is output to a client terminal.

If it is not a new session, since a session number exists in a URL, received parameters are output to a root view object corresponding to the session number (step 1070). Then, it is determined from parameters other than the URL's session number whether or not necessary view objects have been generated (step 1080). This may be determined either by the root view object itself or by any view object subsequent to the root view object at the receipt time of parameters. If necessary view objects have been generated, it moves on to step 1060 (or step 1050). Namely, each view object outputs a part of an HTML document for which it is responsible by using information about attributes of the terminal, and transfers a generated HTML document to a client terminal.

Figure 6:
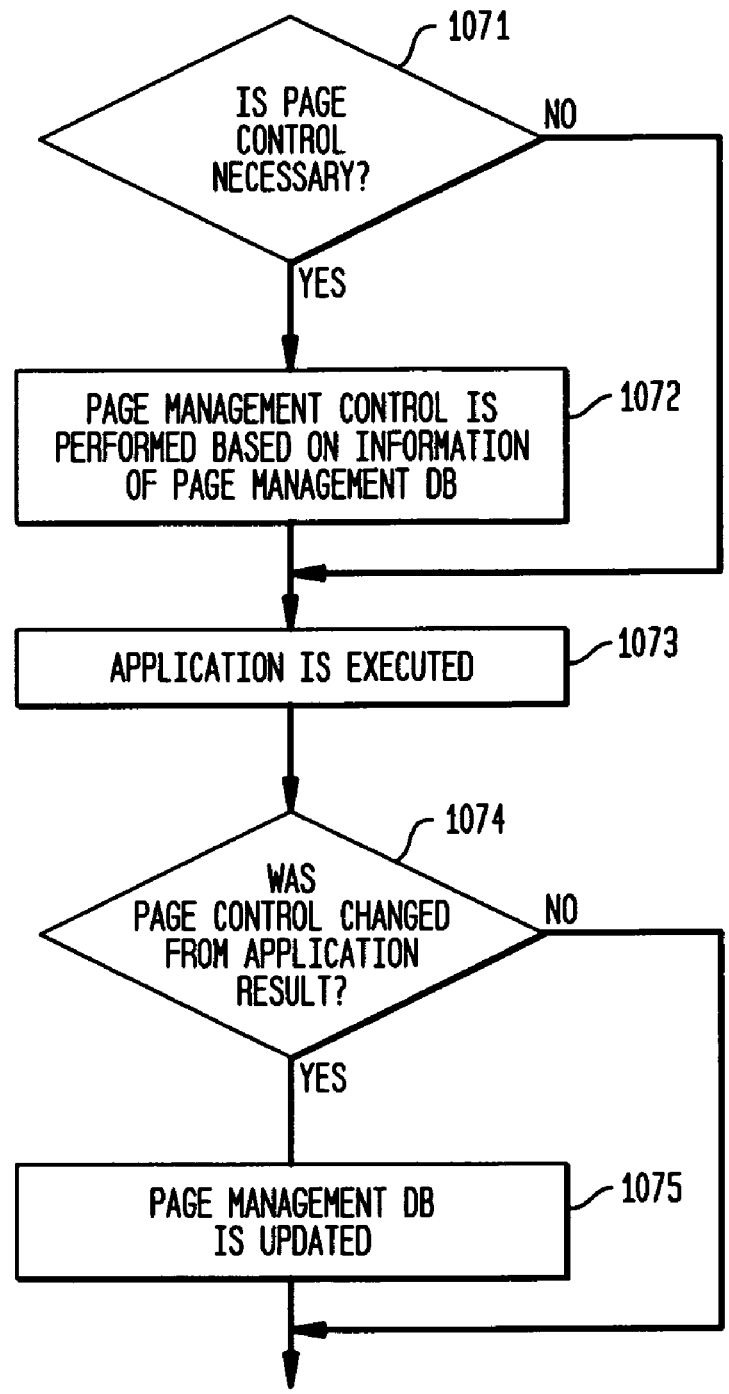
FIG. 6 is a flowchart for explaining a processing of step 1070 shown in FIG. 4.

Step 1070 is further explained by referring to FIG. 6. Step 1070 is further divided into sub-steps for page control such as page authentication and reexecution control of a past page. First, a parameter sent from a terminal is analyzed to determine whether page control is required (step 1071), and if required, page management control is performed (step 1072). For instance, if a page in a history of a browser is reexecuted by a user, as a page identification facility embedded in a URL or an HTTP header of a request can show that a past page is reexecuted, a processing state when the page was displayed is restored from the page management DB by using the identifier as a key. Likewise, authentication of a page which requires authentication can also be performed by embedding an authentication token in a URL or an HTTP header of such a page.

Figure 7:
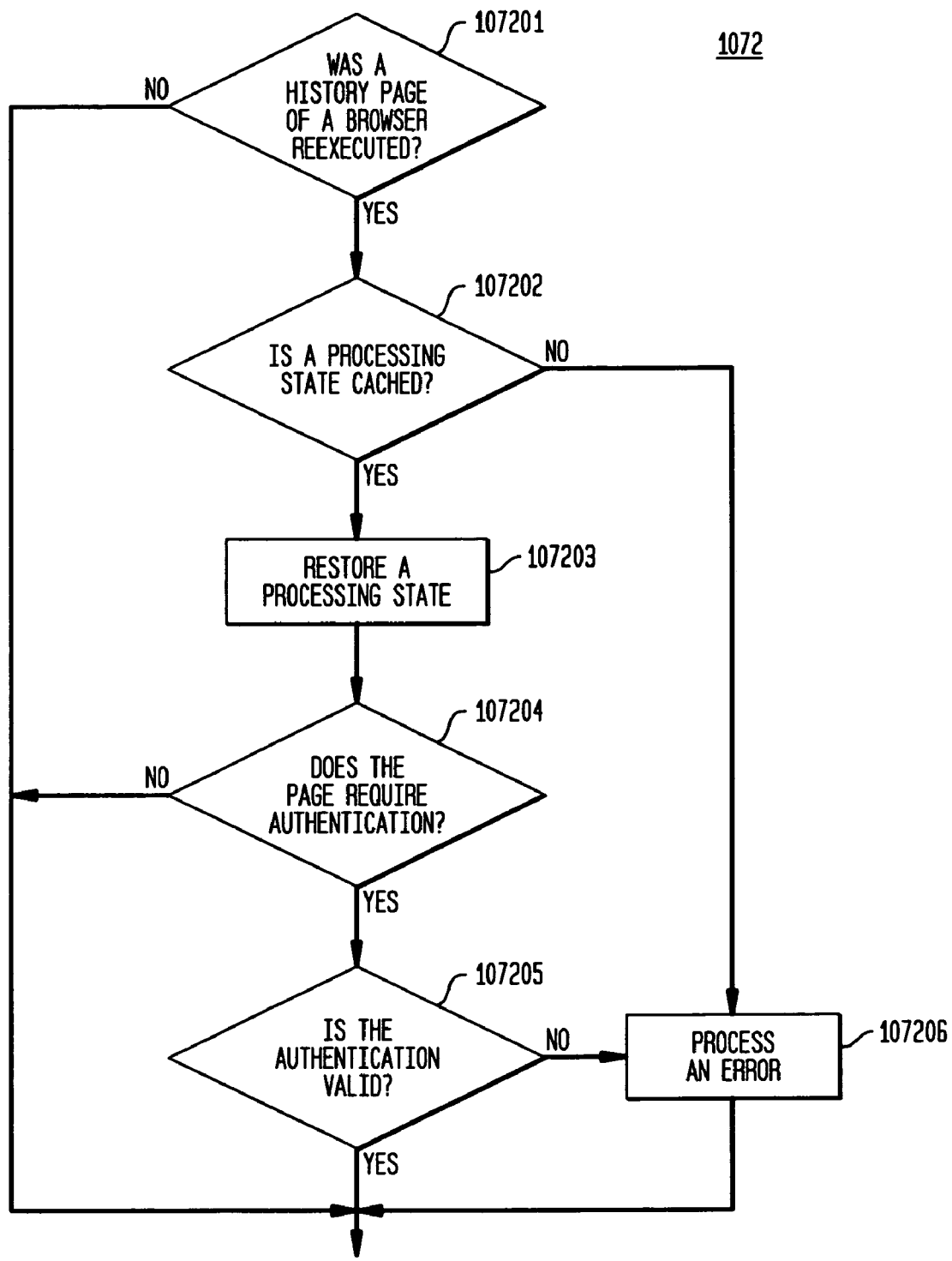
FIG. 7 is a flowchart for explaining a processing of step 1072 shown in FIG. 6.

Step 1072 is further explained by referring to FIG. 7. As page management control of step 1072, specifically, preparations are made for authentication of a page or reexecution of a past page. The above drawing represents these sub-steps. First, a parameter sent from a terminal is analyzed to determine whether a page in a history of a browser has been used (step 107201). Here, if a new page which does not exist in a history is used, it is not covered by this sub-flowchart, so it is left as is to move on to a next process. If it is a past page in a history, page management DB 213 is referred to so as to examine whether there is a cache of a past processing state (step 107202). If there is no cache, as it means that reexecution is inhibited, it jumps to an applicable error handling (step 107206). If there is a cache, it is utilized to restore a processing state (step 107203). Next, a tree structure is used to determine whether the page requires authentication (step 107204). This determination is performed by using the tree structure to examine whether the page belongs to a page group which requires authentication. If authentication is not necessary, it is left as is to move on to a next process in the sub-flowchart. If authentication is necessary, it is checked whether authentication of the page is invalidated on an authentication token included in a parameter sent from a terminal or page management DB 213 so as to determine whether the authentication is valid (step 107205). If the authentication is valid, it is left as is to move on to a next process. If it is invalid, it jumps to an error handling in step 107206.

FIG. 6 is referred to again.

Next, an original process of an application is executed (1073). For instance, in the case of a banking application, designated banking business is performed. At this time, a state after executing the application is cached in the page management DB in preparation for reexecution of a page in a history of a browser. Moreover, on the basis of this processing result, it is determined whether page control has been changed (1074), and the page management DB is updated if necessary (1075). For instance, if the database is committed, it is necessary to inhibit reexecution of an update process page of the database. Namely, an applicable cache in a processing state of the page management DB is cleared. As another example, if a processing result is authenticated (or authentication till then was discarded), an applicable portion of the page management DB is updated.

Figure 8:
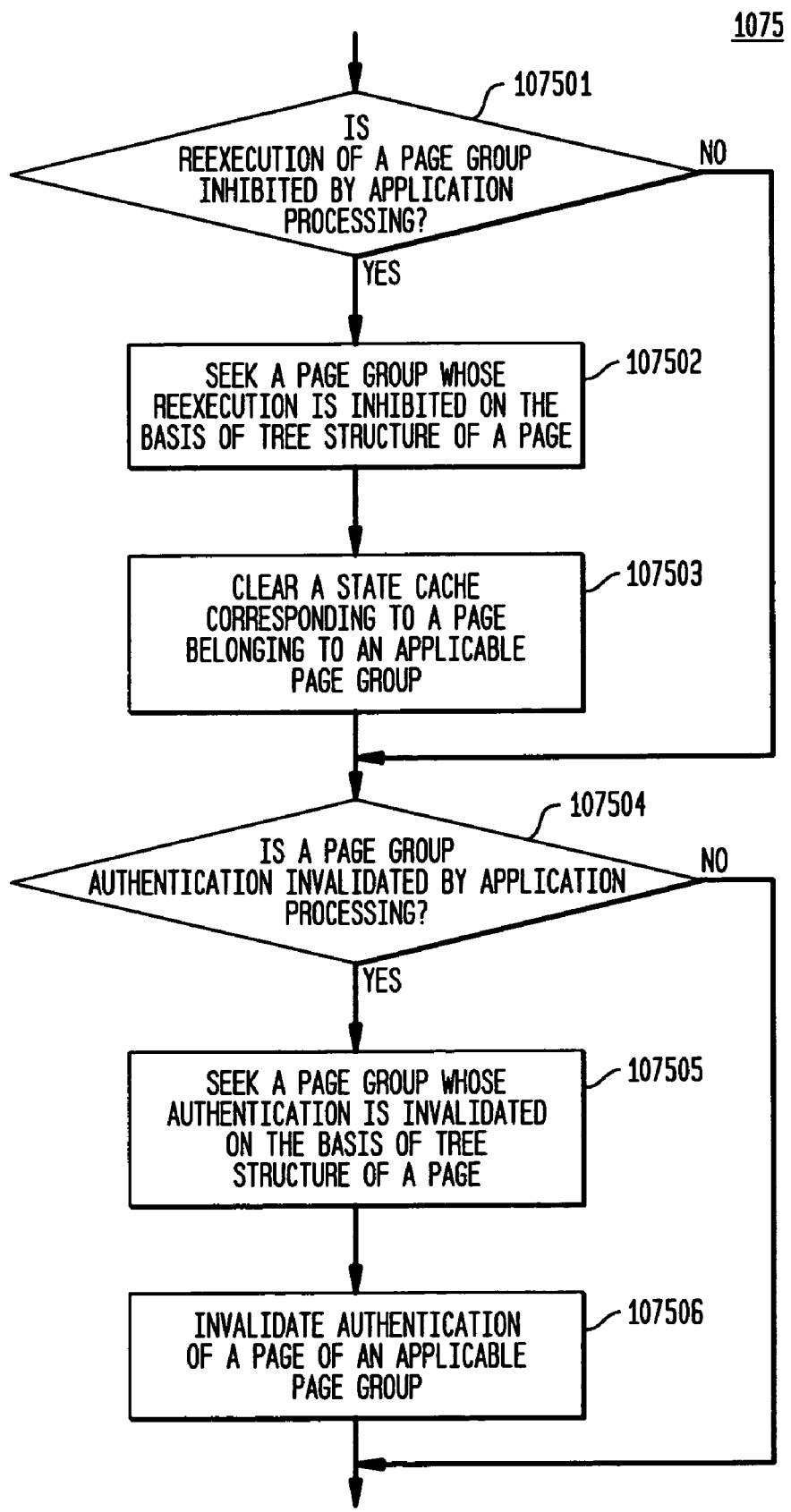
FIG. 8 is a flowchart for explaining a processing of step 1075 shown in FIG. 6.

Step 1075 is further explained by referring to FIG. 8. As an update of the page management DB in step 1075, to be concrete, invalidation of page authentication or inhibition of reexecution of a past page are performed. The above drawing represents these sub-steps. First, a result of executing an application as a step before step 1075 (step 1073) is examined so as to determine based on the execution result whether to inhibit reexecution of a certain page group (step 107501). If it is necessary to inhibit reexecution, the page group is calculated based on a page group name designated in an application program and a tree structure of page definitions (step 107502). Next, a cache storing of a processing state corresponding to a page belonging to the applicable page group is removed from page management DB 213 (step 107503). If it is not necessary to inhibit reexecution, steps 107502 and 107503 are skipped. Likewise, from a result of processing an application, it is determined whether authentication should be invalidated (step 107504). If it is necessary to invalidate authentication, the page group whose authentication should be invalidated is calculated likewise based on a tree structure of page definitions (step 107505). In step 107506, authentication of pages belonging to the applicable page group is invalidated. If it is not necessary to invalidate authentication, steps 107505 and 107506 are skipped.

FIG. 4 is referred to again.

On the other hand, if it is determined that necessary view objects have not been generated, it is determined whether or not new data objects are required (step 1090). If new data is required, since the data may not be available from the data objects generated before then, data service facility 220 is requested when necessary to generate data objects (moving on to step 1020). If the same session requires new data objects, since it means generating a subtree to the original data object, a process of registering a session number in step 1030 is not executed. Hereafter, view objects corresponding to the newly generated data objects are generated, and the view objects generate an HTML document.

If new data objects are not required in step 1090, a view object generates necessary child view objects by referring to a group of data objects and information about attributes of the terminal, and moves on to step 1060 (or step 1050) (step 1100). Namely, each view object outputs a part of an HTML document for which it is responsible by using information about attributes of the terminal, and transfers a generated HTML document to a client terminal.

Figure 9:
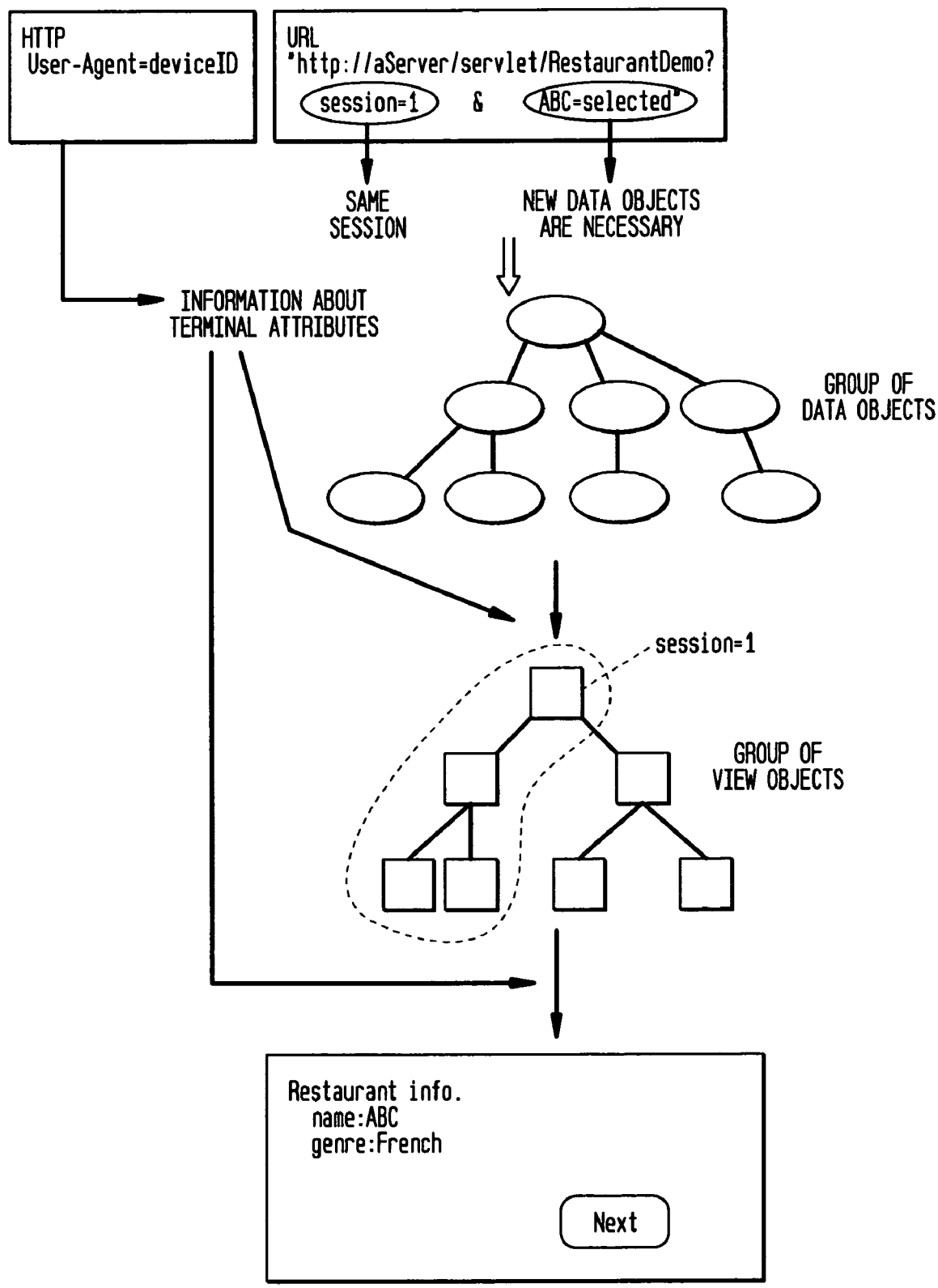
FIG. 9 is a diagram showing an example of processing overview.

Now, the processing after step 1070 is partly outlined by using the example of FIG. 5. FIG. 9 shows a case where a user selected ABC from the HTML document of FIG. 5. The deviceID shown in HTTP's User-Agent field is used as in FIG. 5. On the other hand, the URL becomes "http: aServer/ servlet/RestaurantDemo?session=1&ABC=selected" for instance, which is recognized as the same session as FIG. 5 because of the part of session=1. In addition, it is understood from the part of ABC=selected that ABC of FIG. 5 was selected, while it is determined that new data objects are required by the view objects. Accordingly, data service facility 220 newly generates a group of data objects. Then, a group of view objects is generated by using information about attributes of the terminal. In this example, when generating an HTML document, only the ones surrounded by a broken line in the group of view objects output an HTML document by referring to information about attributes of the terminal. Then, the generated HTML document is displayed at the bottom. In this case, a NEXT button (or a hyperlink) is generated.

Figure 10:
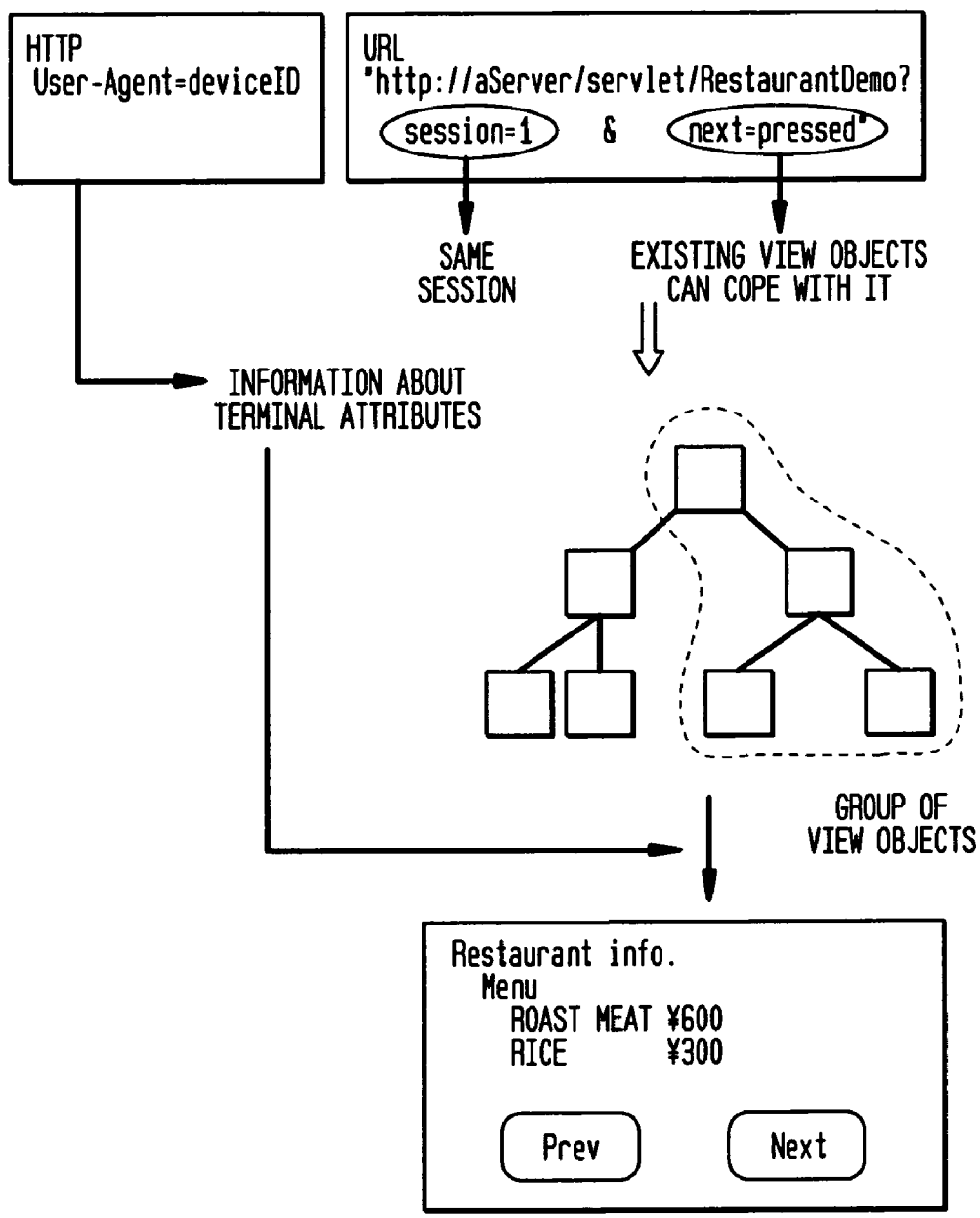
FIG. 10 is a diagram showing an example of processing overview.

FIG. 10 shows a case where a user instructed NEXT in FIG. 9. HTTP's User-Agent field is handled in the same way. The URL is "http: aServer/servlet/RestaurantDemo?session=1&next=pressed" for instance, which is recognized as the same session as FIG. 5 because of the part of session=1. In addition, it is understood from the part of next=pressed that the NEXT button of FIG. 9 was pressed. It is determined, however, that existing view objects is enough. In this case, no change is made to data objects and view objects, and the part shown by a broken line in the group of view objects output an HTML document. This HTML document contains a PREV button (or a hyperlink) and a NEXT button (or a hyperlink).

Examples of a NEXT button (or a PREV button for returning to a previous page) is as follows.

TABLE 1

<a href="/servlet/Restaurant?session=1&next=pressed">
Next
</a>

Inside the anchor tags, not only a mere character string but also an image of a button may be specified. As an attribute value of anchor tags, a URL with a parameter is described. If a user clicks this hyperlink, the URL is transferred from the terminal, the parameter is passed to a controller of the present invention, and the next=pressed parameter is passed to a group of view objects specified by using the session parameter. Detecting from the next=pressed that the NEXT button was pressed, the HTML generating program of the view objects outputs an HTML document on the next page.

Figure 11:
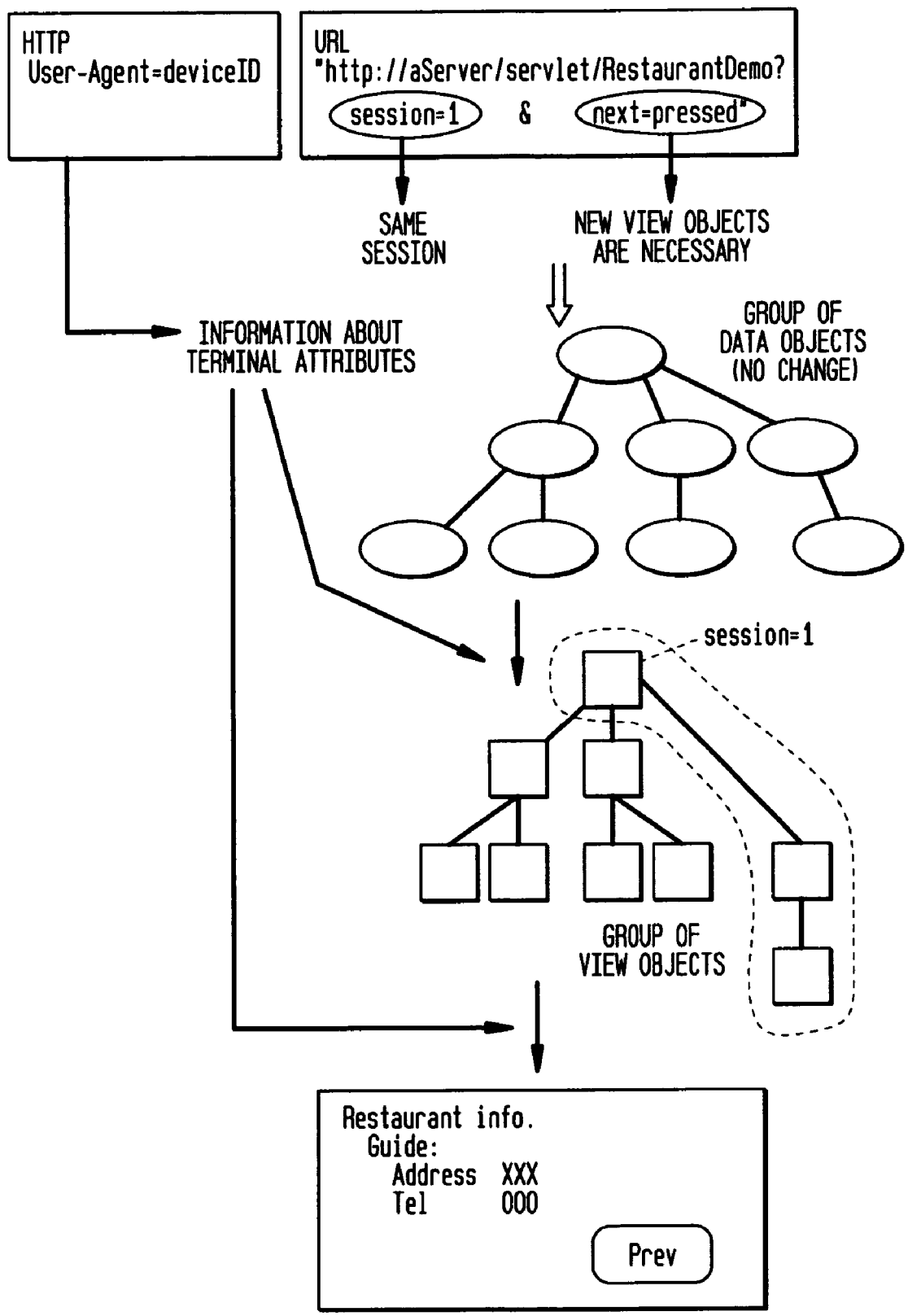
FIG. 11 is a diagram showing an example of processing overview.

FIG. 11 shows a case where a user further instructed NEXT in FIG. 10. HTTP's User-Agent field is handled in the same way. The URL is "http: aServer/servlet/RestaurantDemo?session=1&next=pressed" for instance, which is recognized as the same session as FIG. 5 because of the part of session=1. In addition, it is understood from the part of next=pressed and the internal state of the view objects that the NEXT button of FIG. 10 was pressed. It is determined here that the group of view objects require new view objects. In such a case, necessary view objects are generated by referring to the previously generated group of data objects and information about attributes of the terminal. Here, the part shown by a broken line other than a root view object is newly generated. Then, the group of view objects in the part shown by a broken line generates an HTML document while referring to information about attributes of the terminal.

Information about attributes of the terminal which was not described in detail in the above is explained here. In the examples of FIGS. 5 to 11, information about attributes of the terminal is obtained from deviceID contained in HTTP's User-Agent field, corresponding information of which is included in terminal DB 250. For instance, a corresponding table wherein such information about attributes of the terminal can be obtained from deviceID is provided. Information about attributes of the terminal may include what FIG. 12 shows. For instance, ScreenSize (screen size), ScreenRatio (aspect ratio), ScreenQuality (screen fineness), ColorDepth (number of colors), ModemSpeed (communication speed), Image (whether images are usable), Table (whether tables are usable), Frame (whether frames are usable), ScrollBar (whether scrolling is possible), PointingDevice (whether pointing devices are usable), etc. The right columns of FIG. 12 show examples of respective values. Meanwhile, it is not necessary that all the items are specified for all the deviceIDs. Also, the values of each line may take other values.

Furthermore, it is also possible to perform a further phase of processing. Namely, a rule base for terminal attributes is provided so as to generate more general terminal attributes from the values of terminal characteristics as in FIG. 12 which are used for converting a display structure and generating display instructions. It is also possible, for instance, to classify a single parameter by deciding its range instead of a concrete numeric value, such as a slow communication speed in case of ModemSpeed smaller than 14.4K, a fast communication speed in case of ModemSpeed larger than 56K, a medium speed in other cases, etc., and to generate terminal attributes from multiple parameters, such as images displayed slowly, sequential representation due to no pointing device and a slow communication speed, etc.

In addition, while only a start of a session was explained above, a session ends by a user's explicit instruction of an end if there is the instruction, and if there is no explicit instruction for the end, after a predetermined time has passed from a previous access. If a session ends, the resources used by a group of data objects and a group of view objects are released.

Here is a brief explanation of how to generate a data object. A Web application's content creator creates application definition document 300 (FIG. 13). Application definition document 300 is described in a kind of definition language. This language may be defined as a unique markup language, for instance, by using XML (W3C, "Extensible Markup Language (XML) 1.0", http: www.w3.org/TR/1998/REG-xml-19980210). As regards an example of restaurant services, a description as in FIG. 14 is possible for instance.

In this case, the restaurant information services to be defined here comprises the two processes (corresponding to pages on display) of retrieval of restaurants and display of restaurant information, the process of display of restaurant information further comprising a display item of restaurant information and a link for returning to the retrieval page. Likewise, it is described that the item of restaurant information comprises display items at a level thereunder. In FIG. 14, partial omission is performed. In creating such a definition document, a content creator may either describe it directly by using a text editor or use an authoring tool such as a word processor having a layout function.

An example of specifying reexecution control for the application definition language of FIG. 14 is further explained by using FIG. 15. To the application definition language of FIG. 14, a process for handling restaurant reservations is added as illustrated in FIG. 15. In this handling of reservations, there are roughly display items for displaying a reservation state and for entering an application for reservation and accepting a reservation. As to these display items, it is described that they, as an attribute, belong to a page group called "reprocessing inhibited after reservation acceptance" (a keyword for pageGrp=). In addition, it is specified as an attribute of a decision button for executing handling of reservations that, if a reservation is accepted, the display items belonging to this page group are not reprocessed (a keyword for invGrp=).

Therefore, on a screen where display control information generated according to this description is processed by a browser, after a user presses a decision button, reprocessing (acceptance of display and a reservation change) of these display items and any display item of a lower level is inhibited by a facility of the present invention. After a reservation is accepted, if a user attempts with a back button of a browser to return to a display item (page) of "reservation state display" and recall it, it is not displayed so as to prevent a double-booking.

As reexecution control of a page also copes with a dynamically generated screen, a page group is defined by using a page definition tree. The above FIG. 16 is an example of a restaurant in FIG. 15 especially showing a page definition tree of the process for handling reservations. A process for handling reservations has the three display items, namely, reservation state display, reservation acceptance screen and reservation acceptance result screen. Moreover, reservation state display has two types of sub-display items, namely, reserved time and its vacancy information. The same holds true with reservation acceptance screen.

These display items are dynamically displayed as a page according to display capability of a terminal, and it is not predetermined which level is to be a page. For instance, in the case of a large-size screen such as a PC, reservation state display or reservation acceptance screen should be a unit as a page, while, in the case of a PDA, etc, with a smaller screen, the individual sub-display items, namely, reserved time and vacancy information may make one page.

Here, in the application definition language of FIG. 15, a page group called "reprocessing inhibited after reservation acceptance" is merely specified in the definitions of the two display items, namely, reservation state display, and reservation acceptance screen, while a child of a page definition tree also belongs to the page group. Namely, the page group called "reprocessing inhibited after reservation acceptance" has display items in a broken line (namely, a page) in the above drawing as its members.

FIG. 13 is referred to again.

Definition language analyzer 310 analyzes documents written in such a language. An example of such an analyzer is IBM XML for Java (http: www.alphaworks.ibm.com/formula/xml). An analyzer transfers it analysis results to a object generator. Analysis results are data represented in a tree structure of objects which looks as if a tag structure was made into one object (a tag object in a nest is a child), as mentioned in W3C, "Document Object Model Specification"(http: www.w3.org/TR/WD-DOM-1998-0416).

A data object generator generates data objects based on a tree structure which is the result of analysis. Generally, an object is generated by determining a class of a data object from an object of analysis result. The structure is also the same.

Instead of writing all information on an application definition document, such information content may be retrieved from an existing database. In this case, there are descriptions in the definition document about a specified method for retrieving from the database and references to retrieval results, and based on such designations, the data object generator makes inquiries to the database via communication with a database system called a database connector. As results of database retrieval are returned through the database connector, the data object generator generates data objects which reflect results from the database based on referential designations of the retrieval results. The structure at this time is determined by the tags of a definition document which designate the database. As an example of such a definition document which contains designations of a database (FIG. 17), a case of FIG. 14 is taken up where the Restaurant Information is dynamically retrieved from a database.

FIG. 18 shows an example of a group of data objects generated by performing such processing. The "Restaurant's Details page" required to be output here comprises two objects of "Restaurant Information" and "Link to Search Page" for returning to the retrieval screen. Moreover, while the Restaurant Information has various information of restaurants desired by a user, it is divided into three categories of "Attribute", "Guide" and "Menu" here. Under each category, objects corresponding to necessary information are generated.

Figure 19:
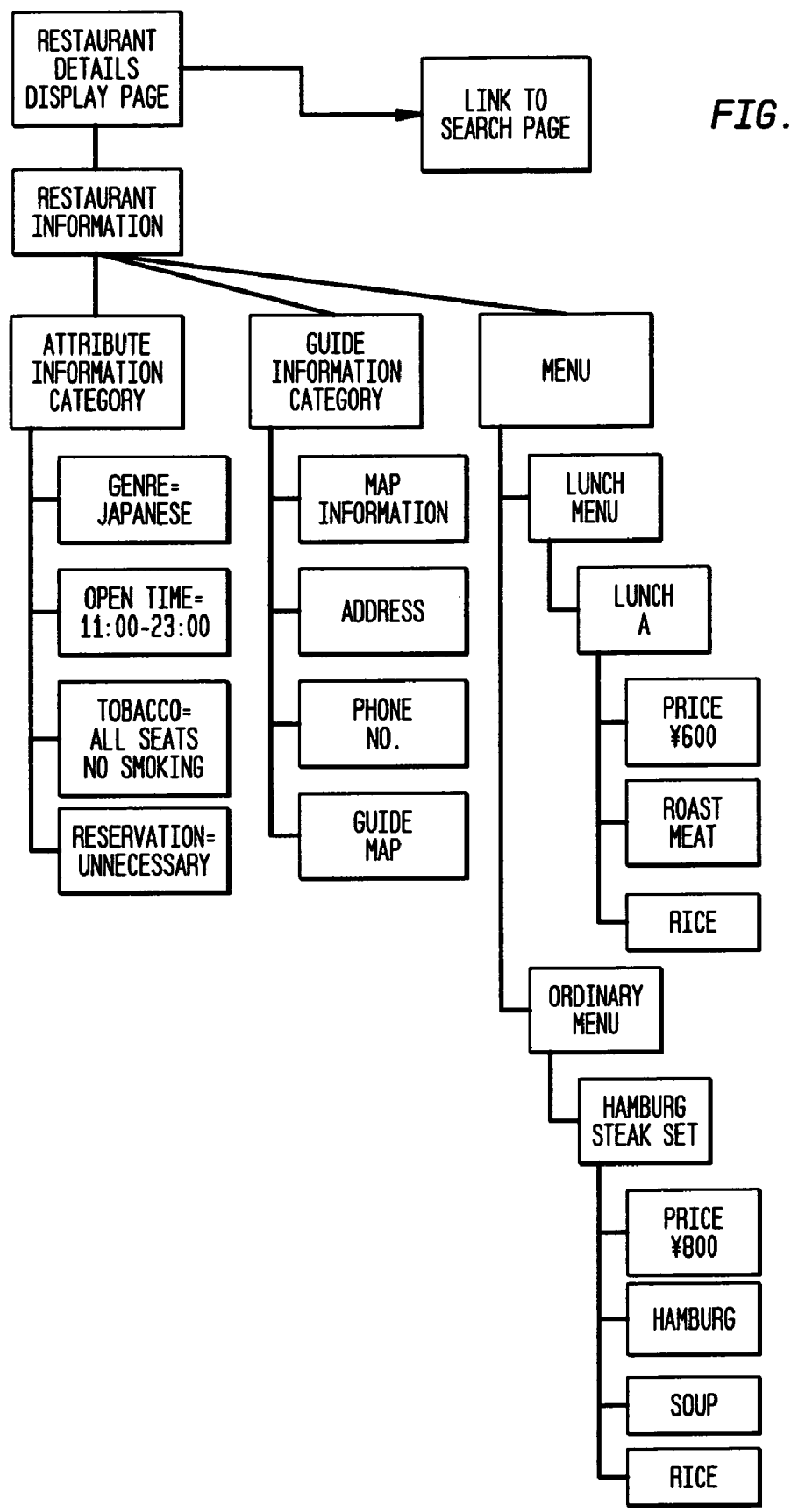
FIG. 19 is a diagram showing an example of attributes defined by application objects.

In the present invention, the attributes shown in FIG. 19 are defined as to a data object. Those are defined as follows: if child objects exist, the child objects as a group; numeric priority of data in numbers; whether or not data of the object is to be always displayed even if it is divided, by a switch (a logical value); whether or not the data of the object may be displayed in a divided way, by a switch; in case of an image, whether or not it can be outlined, by a switch; and any data unique to the application, by any form if necessary. This is the instruction information used in generation of a corresponding view object and generation of the display control information by a view object.

The following are two typical examples of what view objects are generated and what the HTML document is generated when these data objects are generated.

(1) Conversion into Display Configuration for a Large Screen of a PC, etc. and HTML Document Output In the aforementioned example, deviceID is fetched from HTTP's User-Agent field received from a client terminal to obtain corresponding information about attributes of the terminal. The following is explained on the assumption that this information about attributes of the terminal is already obtained. In this example, the information includes information of "Large Screen" (to be more specific, a client terminal comprises a display whose resolution may be classified as a large screen).

Figure 20:
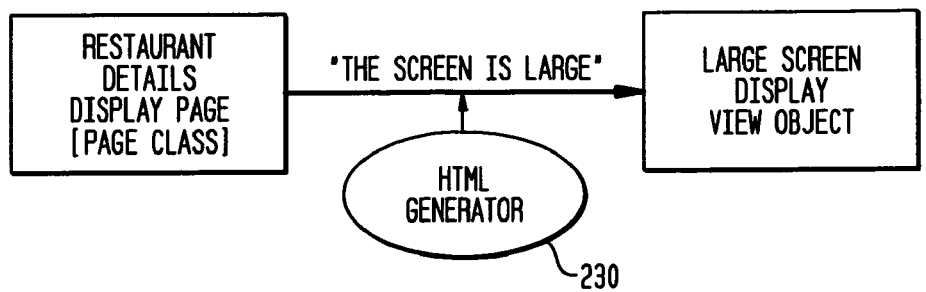
FIG. 20 is a diagram for explaining the processing for generating view objects for a large screen.

First, a view object corresponding to an object which is to be a root of a tree structure of data objects is generated (FIG. 20). HTML generator 230 which performs this generation determines a class of the view object (a view object class for displaying a page for a large screen) and an initial parameter for generating objects by using a class of a root data object ("Page Class" in the example), unique knowledge to an application field (for instance, "a restaurant is displayed on a page") and information about attributes of the terminal ("Large Screen" in this case) as parameters and actually generates the root view object.

Thus, once a root view object corresponding to a root data object is determined, it is possible to have view objects generate their children one after another starting from the root view object. Namely, a view object has a method for generating a child object or a method for requesting a common method for generating a child view object to generate a child view object.

Then, if the view object for displaying a page for a large screen is requested to generate a child view object, it makes inquiries to the "Data Object for Restaurant Details Display Page" to generate its own child view object from the child data object. In this generation, an object is generated generally based on a view object class and an initial parameter. The view object class is determined from its own class (in this case, "View Class for Displaying a Page for a Large Screen"), a data object class, unique knowledge to an application field (if already defined) and information about attributes of the terminal.

Figure 21:
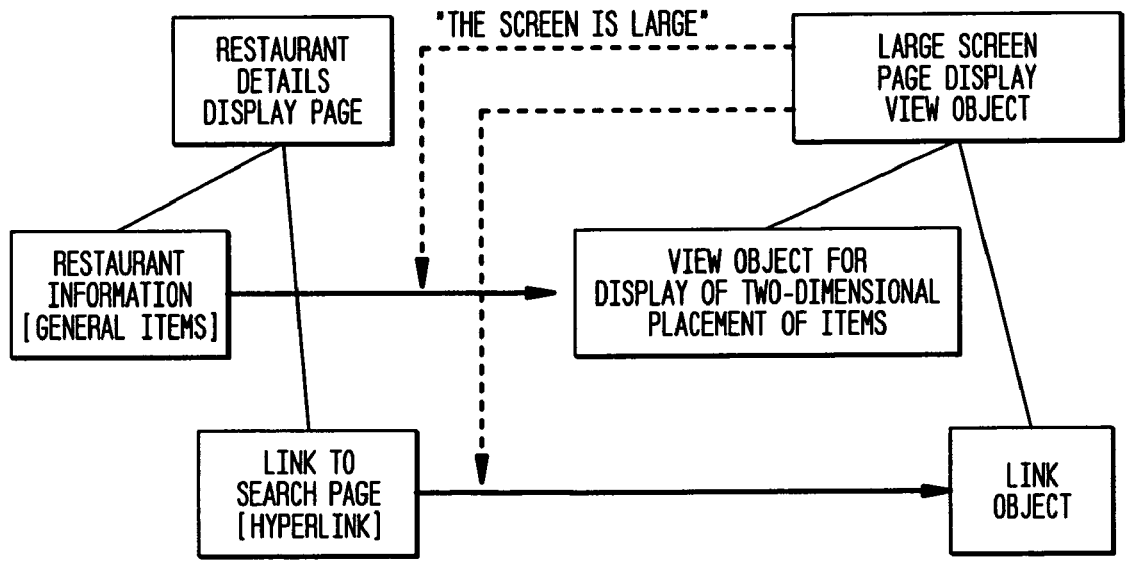
FIG. 21 is a diagram for explaining the processing for generating view objects for a large screen.

For instance, as shown in FIG. 21, in case of "Restaurant Information" which is a child of the data object for "Restaurant Details Display Page," the "Displaying Two-Dimensional Placement of Items" class is determined as a view object class, from "General Items" which is a class of "Restaurant Information" and "Large Screen" information which is information about attributes of the terminal. The view object for display of two-dimensional placement of items is a type of a view object which is intended to place output objects two-dimensionally by making use of a large terminal screen so as to enhance display effects. Likewise, in case of "Link to Search Page" which is another child object of the "Restaurant Details Display Page" data object, it generates a view object called a "Link Object" from the class ("Hyperlink").

Figure 22:
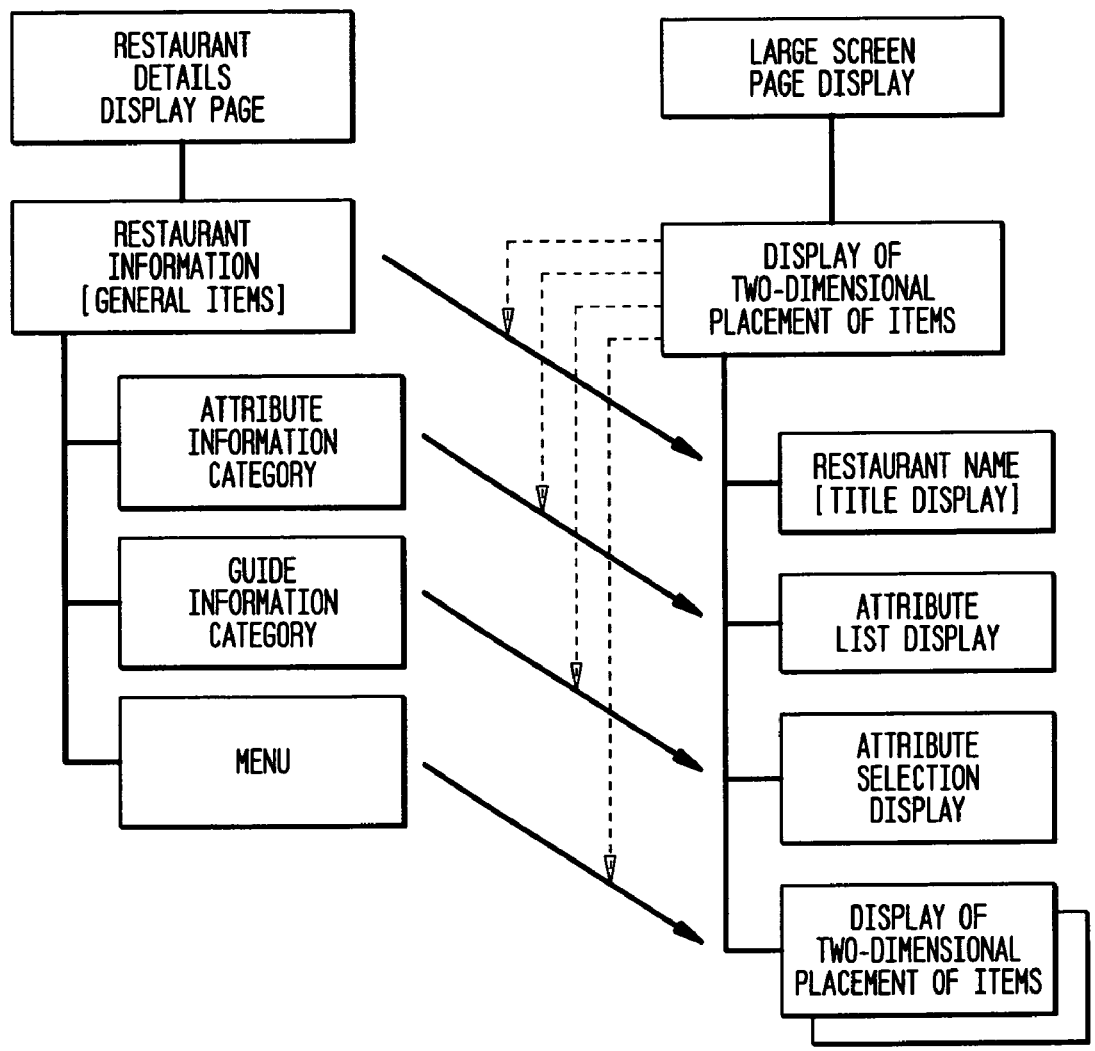
FIG. 22 is a diagram for explaining the processing for generating view objects for a large screen.

If child view objects are generated, a parent view object requests every child to generate a child view object in the same way it was requested before. Namely, as FIG. 22 shows, it generates the "Attribute List Display" view object by making use of the facts that it is a view object for display of two-dimensionally placement of items, "Attribute Information Category" which is a child data object of "Restaurant Information" displays a list of attributes, etc. Likewise, the "Attribute Selection Display" view object is generated for the "Guide Information Category" data object. The "Attribute Selection Display" behaves so as to select one most suitable display item from a user's request or information about attributes of the terminal. For the "Menu" data object, a view object for display of two-dimensionally placement of items is generated again by making use of "Large Screen" of information about attributes of the terminal in the same way as Restaurant Information. In addition, as to Restaurant Information, a view object is added as a child object which displays a restaurant name as a title by making use of information unique to the field that a restaurant name is important as a title.

These four child view objects, namely "Restaurant Name Display," "Attribute List Display," "Attribute Selection Display" and "Two-dimensional Placement of Menu Items" are requested to generate child view objects likewise. For instance, if the "Attribute List Display" view object is requested to generate one, it generates a pair of view objects which are a variable name and a value (view object for displaying a pair of an attribute name and a value) by scanning child data objects of the corresponding "Attribute Information Category." As regards the "Attribute Selection Display" view object, it selects the most suitable one from the children of the "Guide Information Category" data object (here, a PC without map function is mentioned and an image guide map is selected based on priority of data objects) and generates a view object corresponding to it. The same recursive process is also performed for a menu. The structure of the finally generated group of view objects is as shown in FIG. 23.

Figure 23:
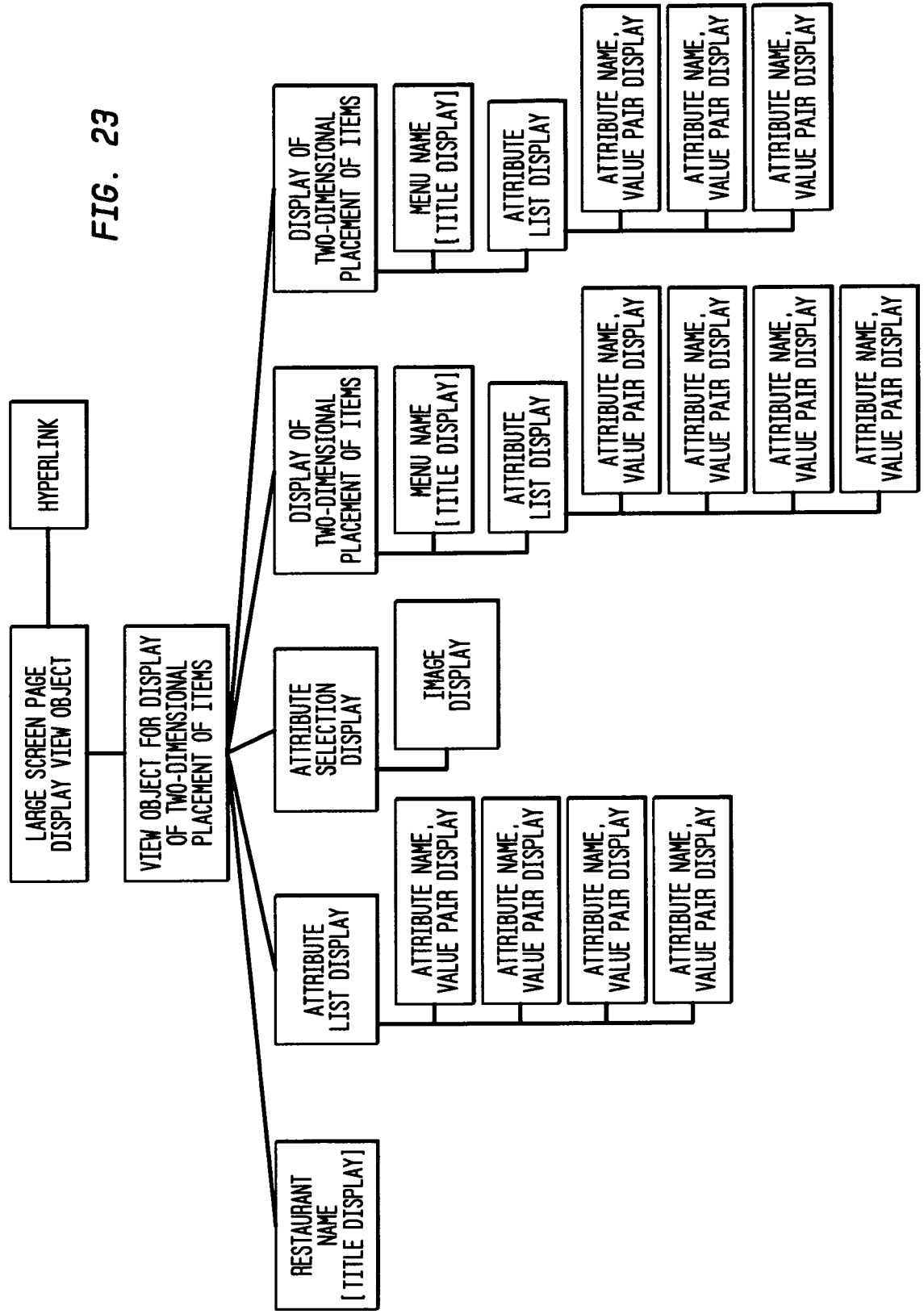
FIG. 23 is a diagram representing a group of view objects for a large screen.

If FIG. 18 showing a structure of a group of data objects and FIG. 23 showing a structure of a group of view objects are compared here, there are three differences: first, Restaurant Name view object is added; second, only one child view object of the Attribute Selection Display view object since the Attribute Selection Display view object is generated against the "Guide Information Category" data object, while four child data objects exist under the "Guide Information Category" data object; and third, Menu Name view object is added because of its importance. As shown above, the data objects do not directly correspond to the view object in their structures.

Once all the view objects are generated, each view object is requested to generate an HTML document. Namely, a root view object is instructed to generate an HTML document, and the Large Screen Page Display view object generates instructions to control an HTML page in the final output, while it requests the "Two-dimensional Placement of Items" view object and the "Hyperlink" object which are children as regards the page content. The requested child view objects go on to generate the entire HTML document by further requesting their own child view objects likewise.

Figure 24:
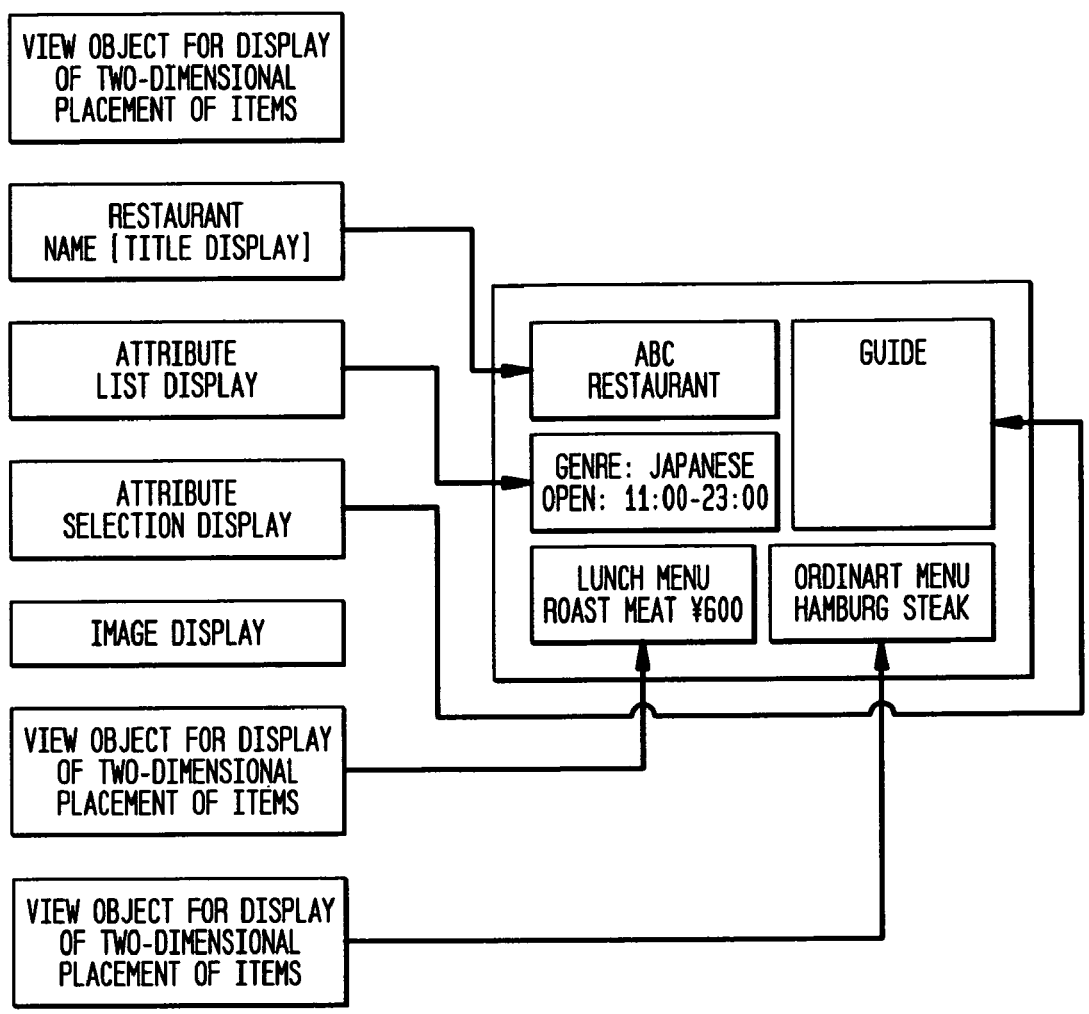
FIG. 24 is a diagram for explaining the processing for the group of view objects in FIG. 23 to output an HTML document.

FIG. 24 shows an outline of HTML generation by a group of view objects in FIG. 23. The view object for Display of Two-dimensional Placement of Items, which is a child of the Large Screen Display view object, generates an HTML document so as to be finally two-dimensionally placed. As explained below, HTML output may be changed by further referring to information about attributes of the terminal in this phase of generating an HTML document. In FIG. 24, child view objects of the view object for Display of Two-dimensional Placement of Items outputs an HTML document so as to be two-dimensionally placed as illustrated. While a child view object of the Attribute List Display view object and child view objects of the view object for Display of Two-dimensional Placement of Items are not shown in the figure, they are outputting an HTML document so as to be displayed in an area secured by each parent view object.

Figure 25:
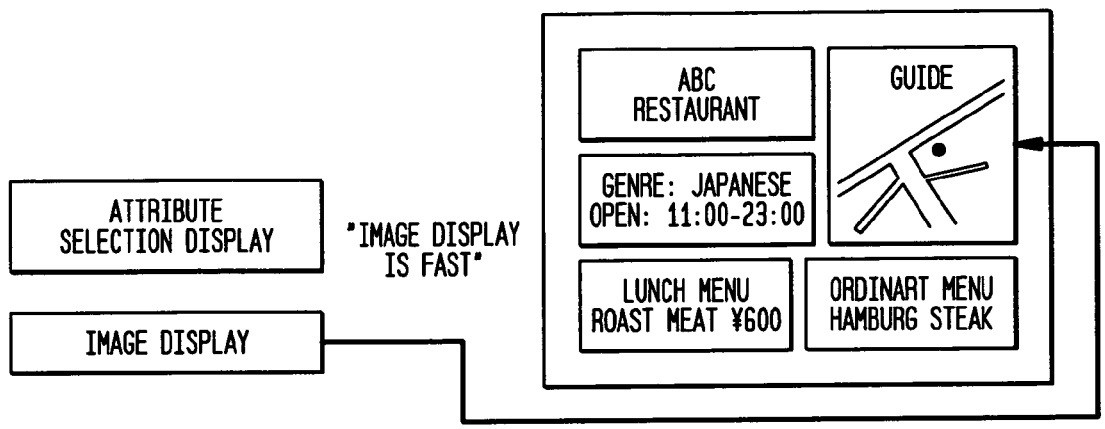
FIG. 25 is a diagram for explaining the processing for the group of view objects in FIG. 23 to output an HTML document.

On the other hand, as regards the Image Display view object which is a child view object of the Attribute Selection Display view object, it outputs an image unchanged if there is information about attributes of the terminal which may be interpreted to mean that image display speed is fast enough (see FIG. 25). While a terminal attribute that image display speed is fast enough is determined by communication speed and drawing performance. But, the above process may be performed just because communication speed is fast.

Figure 26:
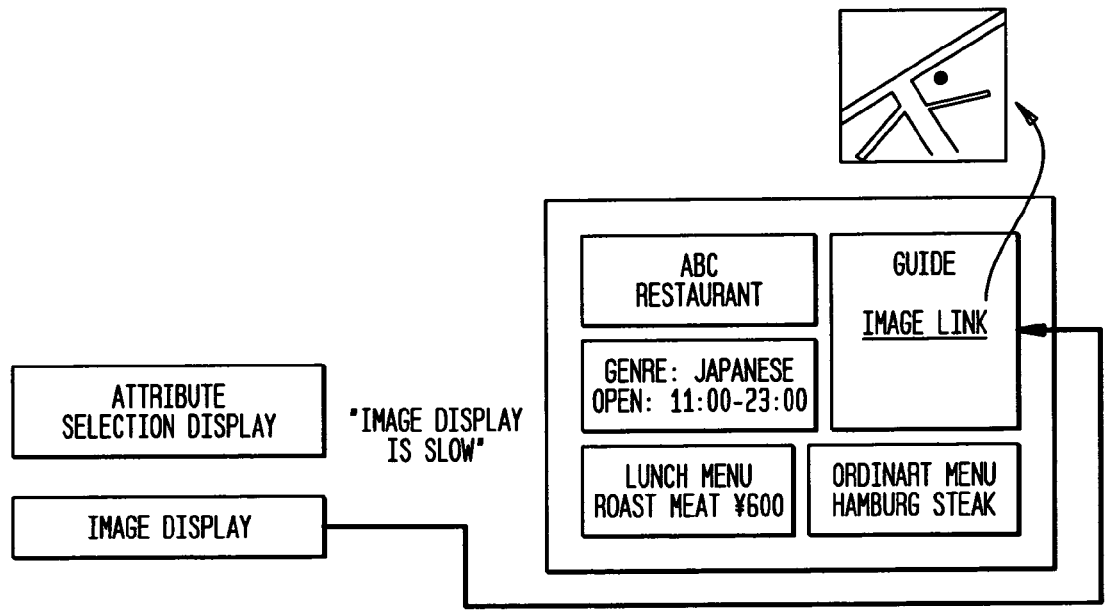
FIG. 26 is a diagram for explaining the processing for the group of view objects in FIG. 23 to output an HTML document.

On the other hand, if there is information about attributes of the terminal which may be interpreted as meaning that image display speed is slow, the Image Display view object does not output an image but outputs a link to the image (see FIG. 26). If a user designates this image, it will transfer this image.

It is also possible, as regards a method for two-dimensional placement, to adjust it for each client terminal by considering the screen size, aspect ratio, etc. Thus, the HTML document may be generated by adapting it to information about attributes of the terminal such as "the terminal screen is large" or "image display speed us slow."

(2) Conversion into Display Configuration for a Small Screen Such as PDA, and HTML Document Output As the amount of information to be displayed at a time is limited on a small screen such as one for PDA, configuration of view objects and their tree structure must be made suitable for it. Information about attributes of the terminal includes data to be interpreted as a small screen.

Figure 27:
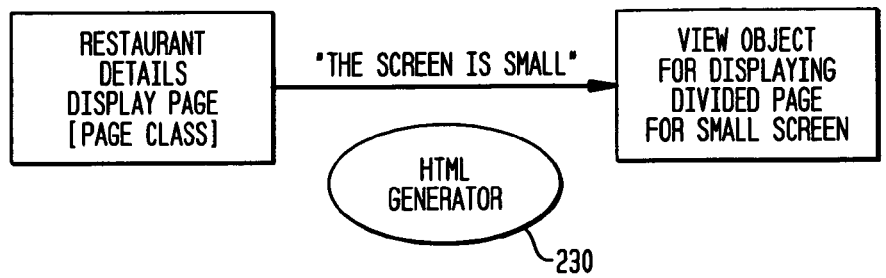
FIG. 27 is a diagram for explaining the processing for generating view objects for a small screen.

Data objects are as in FIG. 18. First, as in case of a large screen, HTML generator 230 generates the view object for Displaying Divided Page for Small Screen by using the class of a root data object and information about attributes of the terminal ("the screen is small" in this case) (see FIG. 27). As a root view object was generated, child view objects are generated just as in case of a large screen.

In this case, however, as the amount of information which can be displayed on a screen is limited, and information is divided and not presented at a time, not a view object which performs two-dimensional placement but a view object which shows information in order of its importance is generated. When this view object further generates child objects, it generates them so that they do not make a category structure suitable for two-dimensional placement but a row structure in which importance of the display content is taken into consideration.

Figure 28:
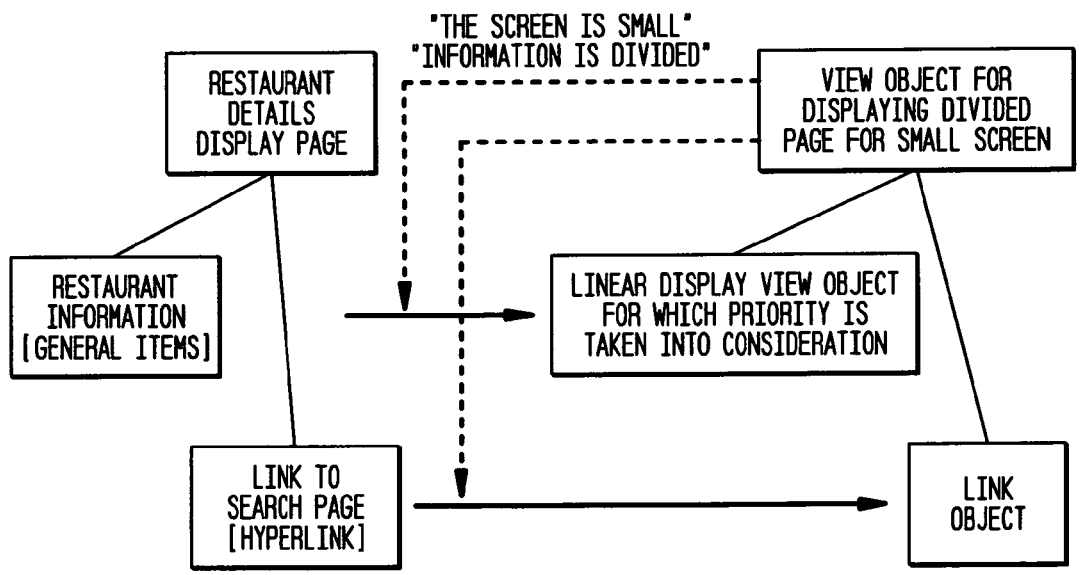
FIG. 28 is a diagram for explaining the processing for generating view objects for a small screen.

Accordingly, as shown in FIG. 28, the Linear Display view objects are generated for which priority corresponding to the Restaurant Information data objects is taken into consideration. A link object is generated as in case of FIG. 21.

Figure 29:
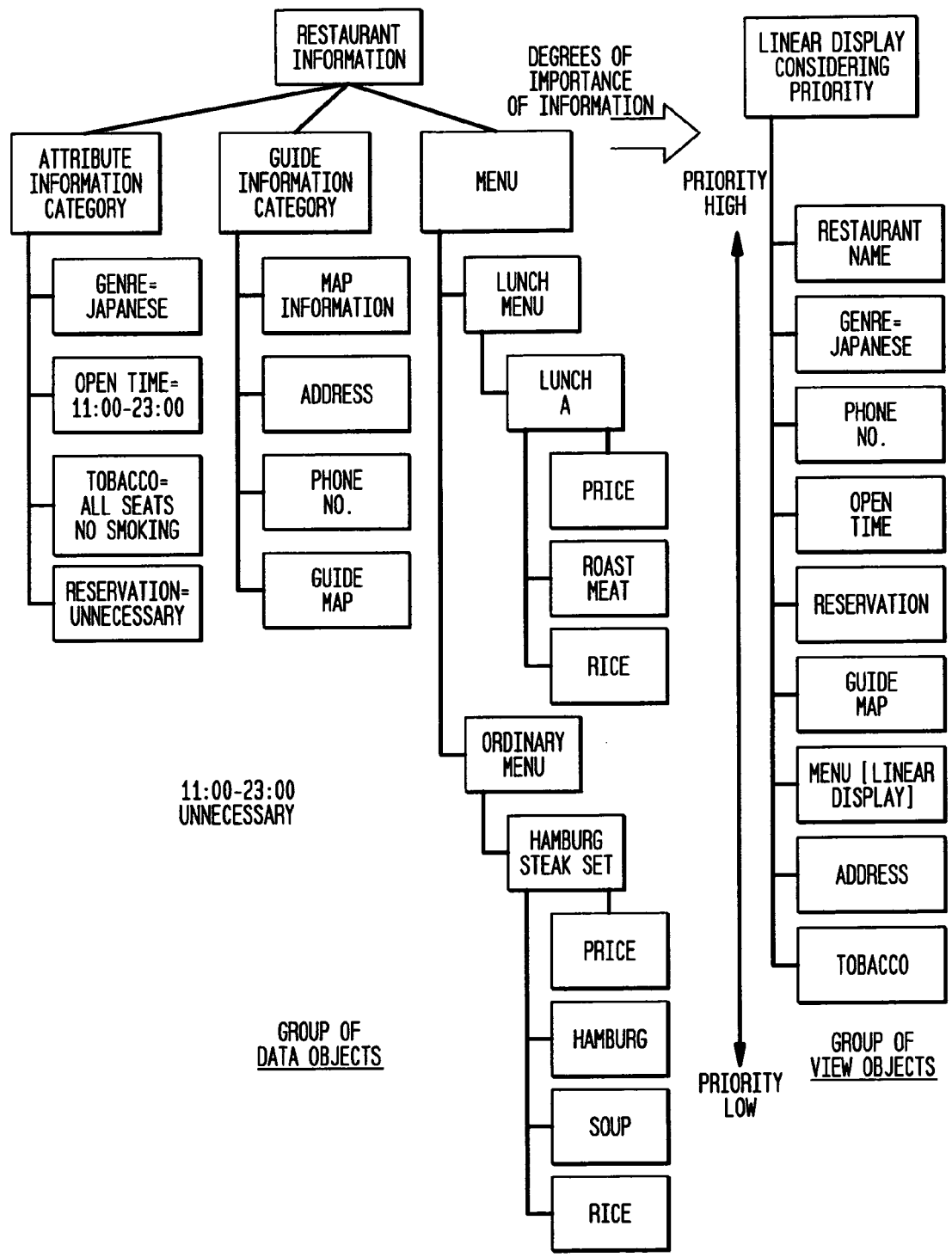
FIG. 29 is a diagram representing a group of view objects for a small screen.

When the Linear Display view object for which priority is taken into consideration generates a child view object, it makes a tree structure totally different from when a client terminal has a large screen, by emphasizing what should be promptly shown to a user and a row structure for easy page dividing (see FIG. 29). In this example, view objects other than those actually displayed at the time are also generated, but it is possible to have them generated when designated by a user. In FIG. 29, they are in a form wherein necessary child view objects are connected in parallel with the Linear Display view objects for which the priority is taken into consideration. In the Figure, the nearer it is to the Linear Display view objects, the higher the priority is. It is also possible to determine this priority reflecting a user's taste by some means.

After view objects are generated, an HTML document is sequentially generated starting from the root view object as in the case of a large screen. Buttons for navigation between pages (the NEXT and PREV buttons) are also automatically generated so that a user can easily navigate divided pages. At this time, output more adapted to a terminal's ability may be generated by using information about attributes of the terminal.

Figure 30:
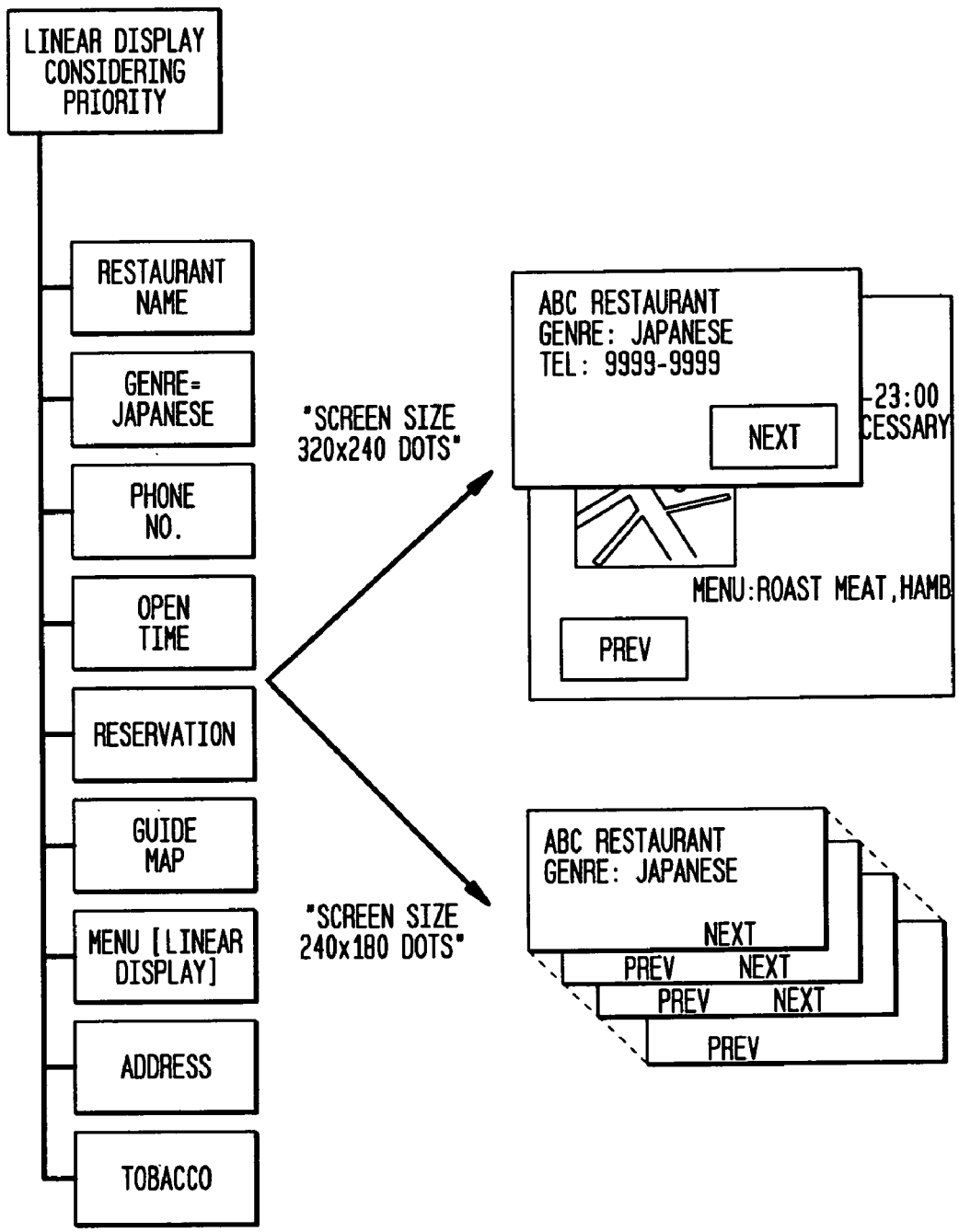
FIG. 30 is a diagram for explaining the processing for the group of view objects in FIG. 23 to output an HTML document.

In case of FIG. 30, an HTML document may be generated so as to display on one page information of three view objects in order of priority from the information of "Screen size: 320% 240 dots" included in the information about attributes of the terminal. In addition, if there is information about a terminal attribute indicating "Screen size: 240% 180 dots," since the screen is still smaller, an HTML document may be generated so as to output information of two view objects on one page.

In the above Figures, the screen after an HTML document was interpreted by a Web browser is represented as output of a group of view objects. However, a group of view objects output control tags of HTML.

While the above examples were explained in terms of HTML, the present invention is not limited to it. For instance, if output document of WML (Wireless Markup Language, Wireless Application Protocol Forum Ltd, "Wireless Application Protocol Wireless Markup Language Specification," Version 30-Apr.-1998), XML, etc. is required, the view objects including a method for outputting them should be generated and also a structure of a group of view objects suitable for the characteristics of WML and XML should be generated.

Figure 31:
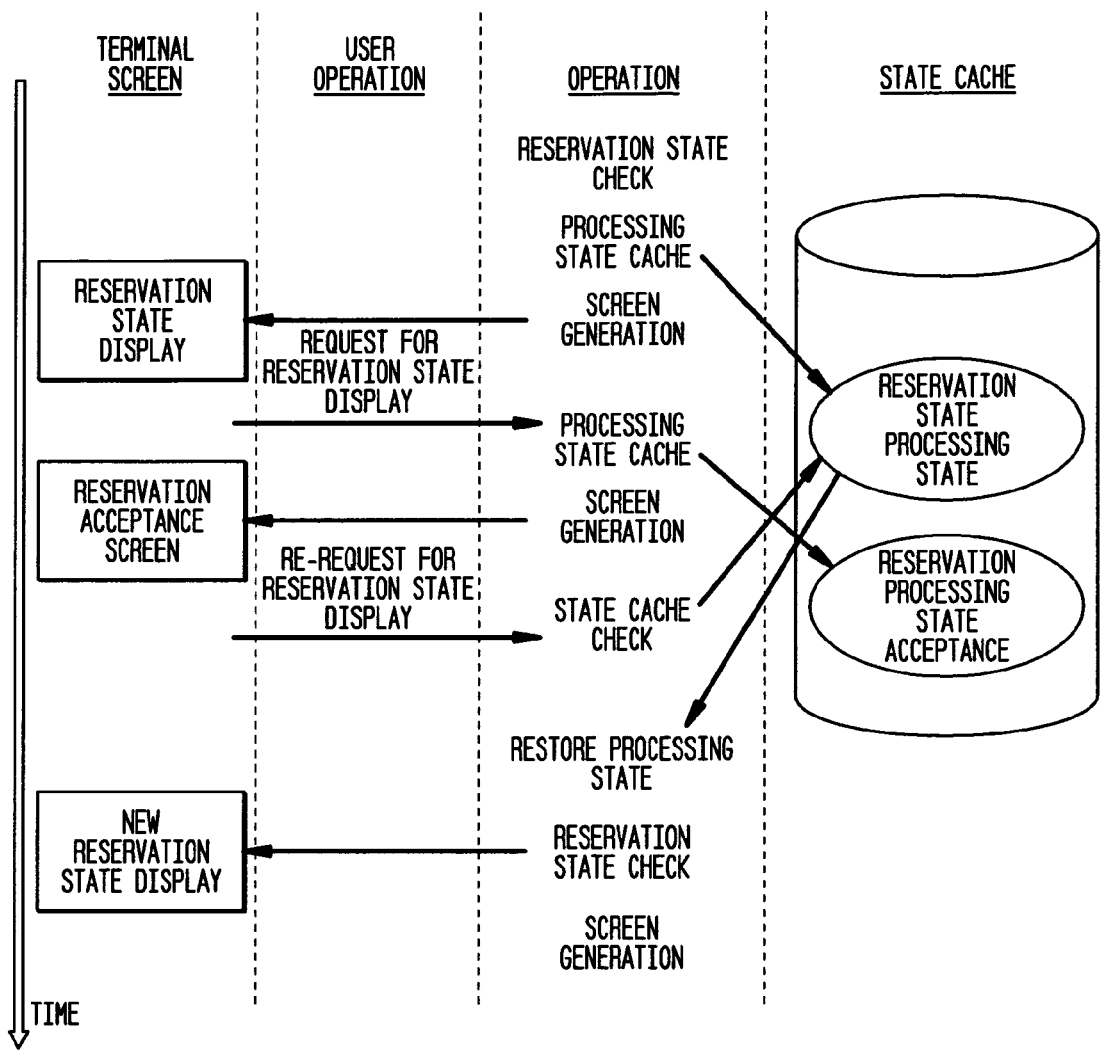
FIG. 31 is a diagram explaining operation of the present invention in time sequence by taking reservation processing of a restaurant as an example in order to describe a facility for controlling reexecution of a page in conjunction with processing.

The above FIG. 31 is a diagram showing operation of the present invention in time sequence by taking reservation processing of a restaurant as an example in order to describe a facility for controlling reexecution of a page in conjunction with processing. It simultaneously shows a display screen of a terminal, operation by a user (contents of a request to a server) and contents of a processing state cache in page management DB 213. First, a user issues a request for a display of a reservation state of a restaurant. This brings controller 210 of the present invention into operation, and it is determined as a new page by page manager 212 therein. Next, application processing device 214 is executed. Here, a reservation state is examined by an application program. Simultaneously, a processing state at the time is stored in a state cache in preparation for reexecution. Since control on reexecution is not required in this process, screen generation as a next process is performed. As a result, display control information for displaying a reservation processing state is sent to a terminal and displayed. Reservation acceptance screen is processed likewise, and the state is stored into a state cache.

Next, it is assumed that a user attempts to have reservation state screen redisplayed by using a history mechanism on a terminal. For instance, an old reservation state screen is invoked by a back button normally provided for a browser, and a reload button also normally provided is pressed. In this case, it is determined by page manager 212 that it is a process for an old screen. In this case, since it is a page in a history, it is checked whether a state is stored in a state cache. In this case, since it should be stored in a state cache as mentioned above, the processing state is restored so as to process an application (reservation state check). To be exact, this result is also stored in a state cache, but it is omitted in the diagram for simplification. Lastly, display control information is generated and sent to a terminal.

Figure 32:
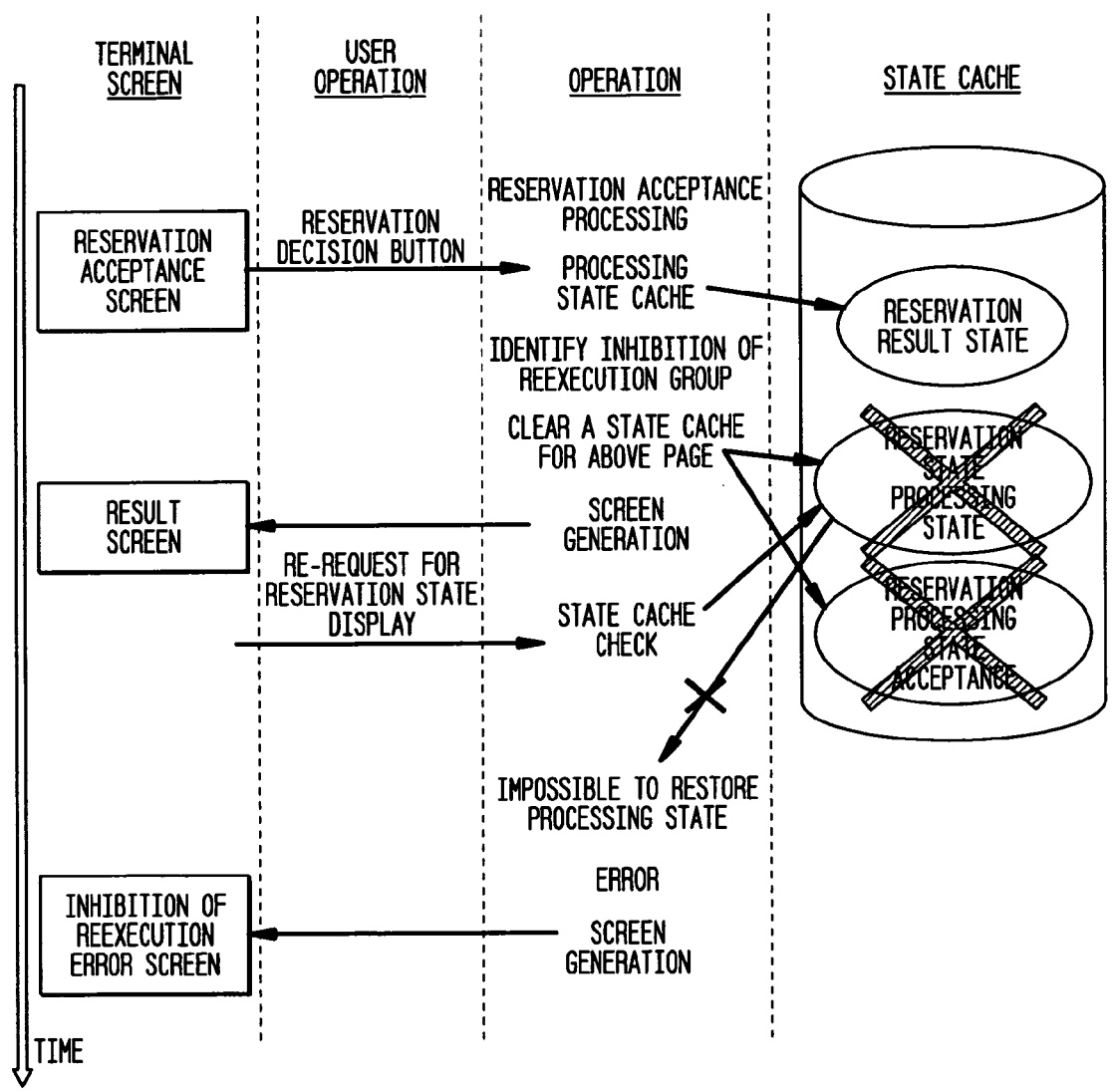
FIG. 32 is a diagram explaining how reexecution is inhibited by using an example of reservation processing of a restaurant.

An example of reservation processing of a restaurant in which reexecution is inhibited is further explained by using the above-mentioned FIG. 32. It is assumed that a user enters necessary matters on reservation acceptance screen and presses reservation decision button. This brings controller 210 of the present invention into operation, and it is determined as a new page by page manager 212 therein. Next, application processing device 214 is executed. Here, a reservation acceptance process is executed by an application program. Simultaneously, a processing state at the time is stored in a state cache in preparation for reexecution. Since reexecution control related to reservations is specified by reservation acceptance in this process, a page on which reexecution is inhibited are identified on the basis of "reexecution inhibited after reservation acceptance" designated by invGrp in the application definition language. As to this example, the pages of "reservation state display" and "reservation acceptance screen" on which pageGrp, a display item attribute of the application description language is specified fall under it. Next, a state cache corresponding to these pages is nullified, and reservation acceptance result screen is generated.

Next, it is assumed that, just as previously, a user attempts to have reservation state screen redisplayed by using a history mechanism on a terminal. For instance, an old reservation state screen is invoked by a back button normally provided for a browser, and a reload button also normally provided is pressed. In this case, it is determined by page manager 212 that it is a process for an old screen. In this case, since it is a page in a history, it is checked whether a state is stored in a state cache. Unlike the previous case, since a state cache is nullified as mentioned above, it turns out that reexecution is inhibited. As a result, display control information for posting an error is generated and sent to a terminal, and error screen is displayed.

Figure 33:
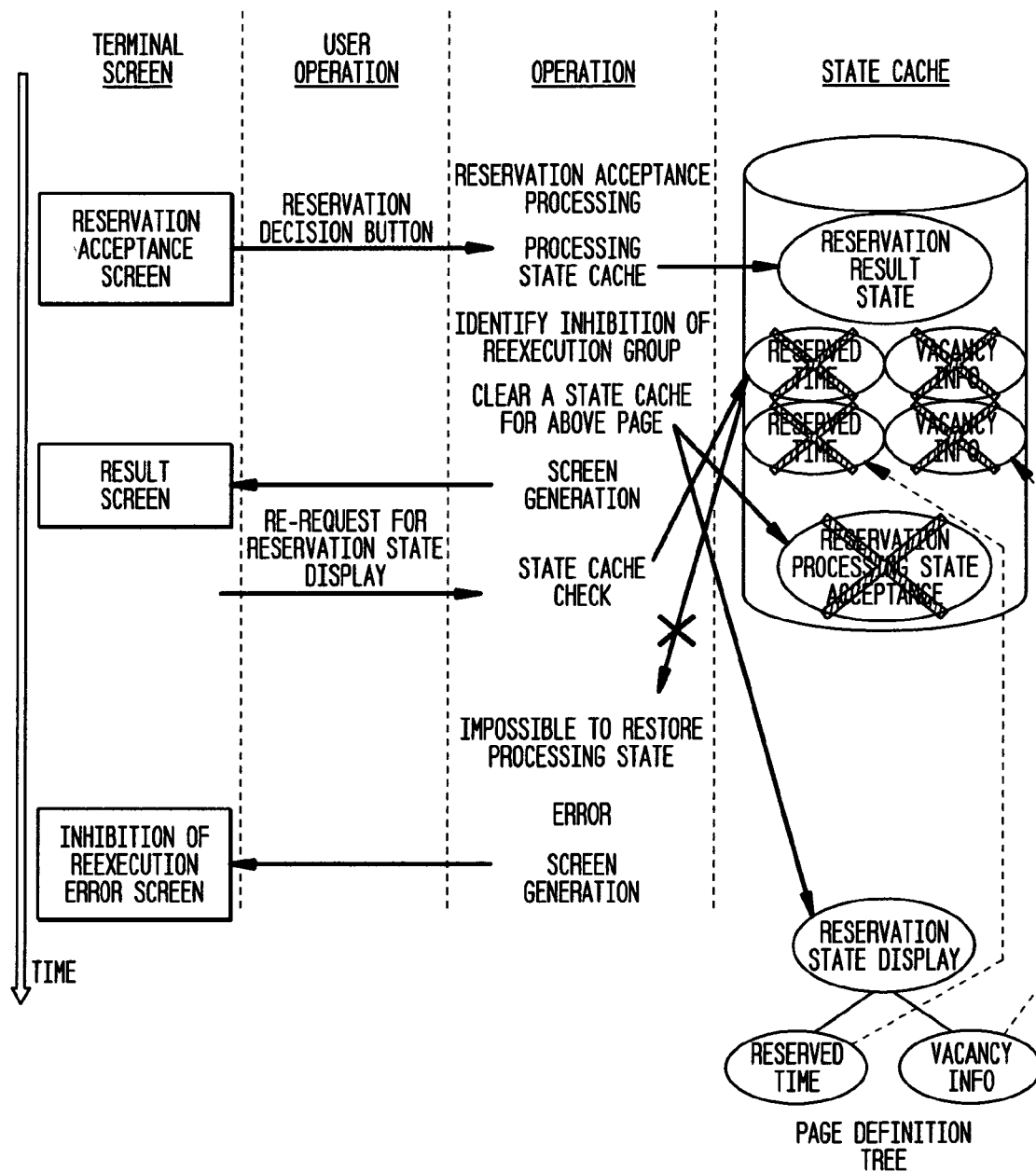
FIG. 33 is a diagram of an example of reservation processing of a restaurant so far, explaining that a reexecution control facility operates without any problem even if a screen structure (due to a terminal attribute) dynamically changes.

Moreover, it is explained by using the above FIG. 33 that, in the examples of reservation processing of a restaurant described so far, a reexecution control facility operates without any problem even if a screen structure (due to a terminal attribute) dynamically changes. In the examples described so far, reservation state display was displayed on one screen since the terminal had a large screen. This time, it is assumed to be a terminal with a small screen, and HTML generator 230 divides a page by child object items of reservation state display, namely "reserved time" and "vacancy information." Accordingly, a state cache is also cached by each of these child items. Here, it is assumed, as previously, that a user enters necessary matters on reservation acceptance screen and presses reservation decision button.

This brings controller 210 of the present invention into operation, and it is determined as a new page by page manager 212 therein. Next, application processing device 214 is executed. Here, a reservation acceptance process is executed by an application program. Simultaneously, a processing state at the time is stored in a state cache in preparation for reexecution. Since reexecution control related to reservations is specified by reservation acceptance, a page on which reexecution is inhibited are identified on the basis of "reexecution inhibited after reservation acceptance" designated by invGrp in the application definition language. As to this example, the pages of "reservation state display" and "reservation acceptance screen" on which pageGrp, a display item attribute of the application description language is specified fall under it. However, a page of reservation state display does not directly exist in a cache, so according to a page definition tree, a state cache corresponding to "reserved time" and "vacancy information" which are children of reservation state display is nullified through the use of their being the page falling under it.

Next, it is assumed that, just as previously, a user attempts to have a page of reserved time and vacancy information as one of reservation state screens redisplayed by using a history mechanism on a terminal.

For instance, an old reservation state screen is invoked by a back button normally provided for a browser, and a reload button also normally provided is pressed. In this case, it is determined by page manager 212 that it is a process for an old screen. In this case, since it is a page in a history, it is checked whether a state is stored in a state cache. Like the previous case, since a state cache is nullified as mentioned above, it turns out that reexecution is inhibited. As a result, display control information for posting an error is generated and sent to a terminal, and error screen is displayed.

Since a page to be displayed is not directly specified but as a unit of a page group, proper reexecution control could successfully be implemented as requested by an application even when an actually displayed page is divided.

Accordingly, the present invention allows documents or display control information to be dynamically generated so as to provide client terminals of various capability with user interface. In addition, a mechanism could successfully be provided, which keeps an application executed at a server independent on the client terminal which uses processing results of the application. Furthermore, processing of an application executed at a server could successfully be separated from generating a display document representing the processing results so that only the parts of generating the displayed document should be changed even if various client terminals newly appear.

In addition, for reexecution of a page in a history by using a screen redisplay function of a browser of a terminal, flexible reexecution and authentication control according to an application processing could successfully be implemented by the present invention by easy specification from an application program. It could also be successfully indicated that this specification readily describes an application processing as a page group and is also effective when dynamically composing a page.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desrire to secure by Letters Patent is:

1. A server for generating display control information for a plurality of remote client terminals, to display documents on each of said terminals in a form adapted to said each of the terminals, the server comprising:

a controller, a server database, a data service facility, an HTML generator, and a terminal database;

the controller receiving parameters and display requests from the client terminals, and returning HTML documents to the client terminals, each of the display requests from each of the terminals including a URL and an HTTP header including information about attributes of the terminal making the request;

the controller controlling operation of the data service facility and the HTML generator;

the controller administering sessions and determining from each received URL whether a request from one of the client terminals belongs to an existing session or a new session;

the controller accessing the terminal database and using identification information obtained from the client terminals to obtain information about attributes of the client terminals making requests, and outputting to the HTML generator said information obtained from the terminal database;

the controller comprising a session identification facility, a page manager, a page management database, an application processing device, and a page re-execution controller;

the session identification facility analyzing one of the parameters sent from one of the client terminals and identifying which session is making a request from said one of the client terminals so as to identify data unique to a given session, the session identification facility further analyzing one of the parameters to determine whether a page in a history of a web browser is reexecuted and whether the page requires authentication so that the page manager identifies a necessary page and fetches necessary information from the page management database to restore a past processing state required for authentication and reexecution;

the application-processing device executing a process unique to a web application;

the data service facility performing processing requests and including means for accessing the server database to generate a group of data objects related to the requested display content, said group of data objects being configured in a tree structure having a root and leaves, said root representing the entire processing in accordance with a web page's document structure, said leaves corresponding to data including character strings and images;

the HTML generator including means for generating a group of view objects using information from the group of data objects and the terminal database, said group of view objects including a root view object and child view objects, the root view object being used by the controller to generate an HTML document; and the controller transferring said generated HTML document to one of the client terminals in a manner formatted for viewing on said one of the client terminals.

2. A server according to claim 1, wherein the controller orders the HTML generator to generate said root view object; and in response to said orders, the HTML generates said root view object while referring to the room object of the group of data objects and information about attributes of the client terminal making the request; and if the generated root view object is ordered to generate an HTML document by the controller, then an HTML document is generated by each view object subsequent to the room view object.

* * * * *

UNITED STATES PATENT AND TRADEMARK OFFICE
CERTIFICATE OF CORRECTION

PATENT NO. : 6,973,619 B1
DATED : December 6, 2005
INVENTOR(S) : Shinichi Hirose et al.

It is certified that error appears in the above-identified patent and that said Letters Patent is hereby corrected as shown below:

Column 2,
Line 23, "sever, parsing" should read -- server, parsing --.

Column 7,
Line 7, "Controller 21Q receives" should read -- Controller 210 receives --.

Signed and Sealed this

Eighteenth Day of April, 2006

JON W. DUDAS
*Director of the United States Patent and Trademark Office*